United States Patent
Yamada et al.

(10) Patent No.: US 6,823,227 B2
(45) Date of Patent: Nov. 23, 2004

(54) METHOD AND DEVICE FOR EXECUTING WORK CONSISTING OF A PLURALITY OF STEPS UNDER COMPUTER CONTROL

(75) Inventors: Shinjiro Yamada, Kawasaki (JP); Seiki Sato, Kawasaki (JP); Katsunori Shimomura, Kawasaki (JP); Tomohito Ohmori, Kawasaki (JP); Michiyo Kuwabara, Kawasaki (JP); Keiji Okamoto, Kawasaki (JP); Katsuji Iwasaki, Kawasaki (JP); Hidenori Sasaki, Kawasaki (JP)

(73) Assignee: INCS Inc., Kanagawa (JP)

( * ) Notice: Subject to any disclaimer, the term of this patent is extended or adjusted under 35 U.S.C. 154(b) by 0 days.

(21) Appl. No.: 10/292,067

(22) Filed: Nov. 12, 2002

(65) Prior Publication Data

US 2003/0065412 A1 Apr. 3, 2003

Related U.S. Application Data

(63) Continuation of application No. PCT/JP01/03944, filed on May 11, 2001.

(30) Foreign Application Priority Data

May 12, 2000 (JP) ...................................... 2000-140418
Dec. 27, 2000 (JP) ...................................... 2000-396690

(51) Int. Cl.[7] .............................................. G06F 19/00
(52) U.S. Cl. ............................ 700/99; 700/11; 700/19; 718/100
(58) Field of Search .......................... 700/2, 3, 7, 11, 700/13, 15, 19, 23, 27, 97, 99, 100; 703/1; 345/964; 718/100

(56) References Cited

U.S. PATENT DOCUMENTS 5,774,355 A * 6/1998 Mizuno et al. ............... 700/23
6,167,320 A * 12/2000 Powell ........................ 700/95
6,195,590 B1 * 2/2001 Powell ........................ 700/36
6,397,117 B1 * 5/2002 Burrows et al. .............. 700/97
2003/0158618 A1 * 8/2003 Browning .................... 700/99

FOREIGN PATENT DOCUMENTS

| JP | 62-71551 | 4/1987 |
| JP | 2-285403 | 11/1990 |
| JP | 4-171166 | 6/1992 |
| JP | 5-147044 | 6/1993 |
| JP | 5-216894 | 8/1993 |
| JP | 9-265491 | 7/1997 |
| JP | 9-204459 | 8/1997 |
| JP | 10-627 | 1/1998 |
| JP | 10-134115 | 5/1998 |
| JP | 11-108063 | 4/1999 |
| JP | 11-188581 | 7/1999 |

* cited by examiner

Primary Examiner—Paul Rodriguez
(74) Attorney, Agent, or Firm—Cohen, Pontani, Lieberman & Pavane

(57) ABSTRACT

A method of executing a plurality of steps that are performed sequentially in temporal order under computer control is provided wherein a central processing computer and a plurality of terminal computers are provided. Each of the plurality of steps is executed by one of the terminal computers. When one of the terminal computers assigned to a single step has completed the work in the step assigned to it and is able to execute the work in the next step, that terminal computer sends a work completion signal to the central processing computer. The central processing computer receives this work completion signal and prepares a work item notice that indicates that the next step can be started, such that the notice can be displayed on the screen of the terminal computer used for the next step. The terminal computer used for the next step allows the work item notice displayed on its display screen to be clicked to start work on the next step assigned to it.

4 Claims, 31 Drawing Sheets

FIG.15

| PROCESSED? | ORDER NUMBER | DATE RECEIVED | CUSTOMER | STEP | ANTICIPATED COMPLETION |
|---|---|---|---|---|---|
| NO | 0111 | 2000/9/1 | A | MOLD DESIGN | 2000/9/30 |
| NO | 0112 | 2000/9/2 | B | MOLDING PLAN | 2000/9/30 |
| NO | 0011 | 2000/8/20 | C | SLIDE CORE | 2000/9/20 |

FIG.18

| PROCESSED? | ORDER NUMBER | DATE RECEIVED | CUSTOMER | STEP | ANTICIPATED COMPLETION |
|---|---|---|---|---|---|
| NO | 0002 | 2000/8/15 | D | NC UPPER MOLD BLOCK | 2000/9/15 |
| NO | 0002 | 2000/8/15 | D | NC LOWER MOLD BLOCK | 2000/9/15 |
| NO | 0002 | 2000/8/15 | D | NC SLIDE NO. 1 | 2000/9/15 |
| NO | 0002 | 2000/8/15 | D | NC SLIDE NO. 2 | 2000/9/15 |
| NO | 0002 | 2000/8/15 | D | NC LOOSE CORE NO. 1 | 2000/9/15 |
| NO | 0002 | 2000/8/15 | D | NC LOOSE CORE NO. 2 | 2000/9/15 |
| NO | 0002 | 2000/8/15 | D | NC PLATE | 2000/9/15 |

FIG.19

| PROCESSED? | ORDER NUMBER | DATE RECEIVED | CUSTOMER | STEP | ANTICIPATED COMPLETION |
|---|---|---|---|---|---|
| NO | 0001 | 2000/8/10 | E | MACHINING OF UPPER BLOCK | 2000/9/10 |
| NO | 0001 | 2000/8/10 | E | MACHINING OF LOWER BLOCK | 2000/9/10 |
| NO | 0003 | 2000/8/18 | F | FINISHING OF UPPER BLOCK | 2000/9/18 |

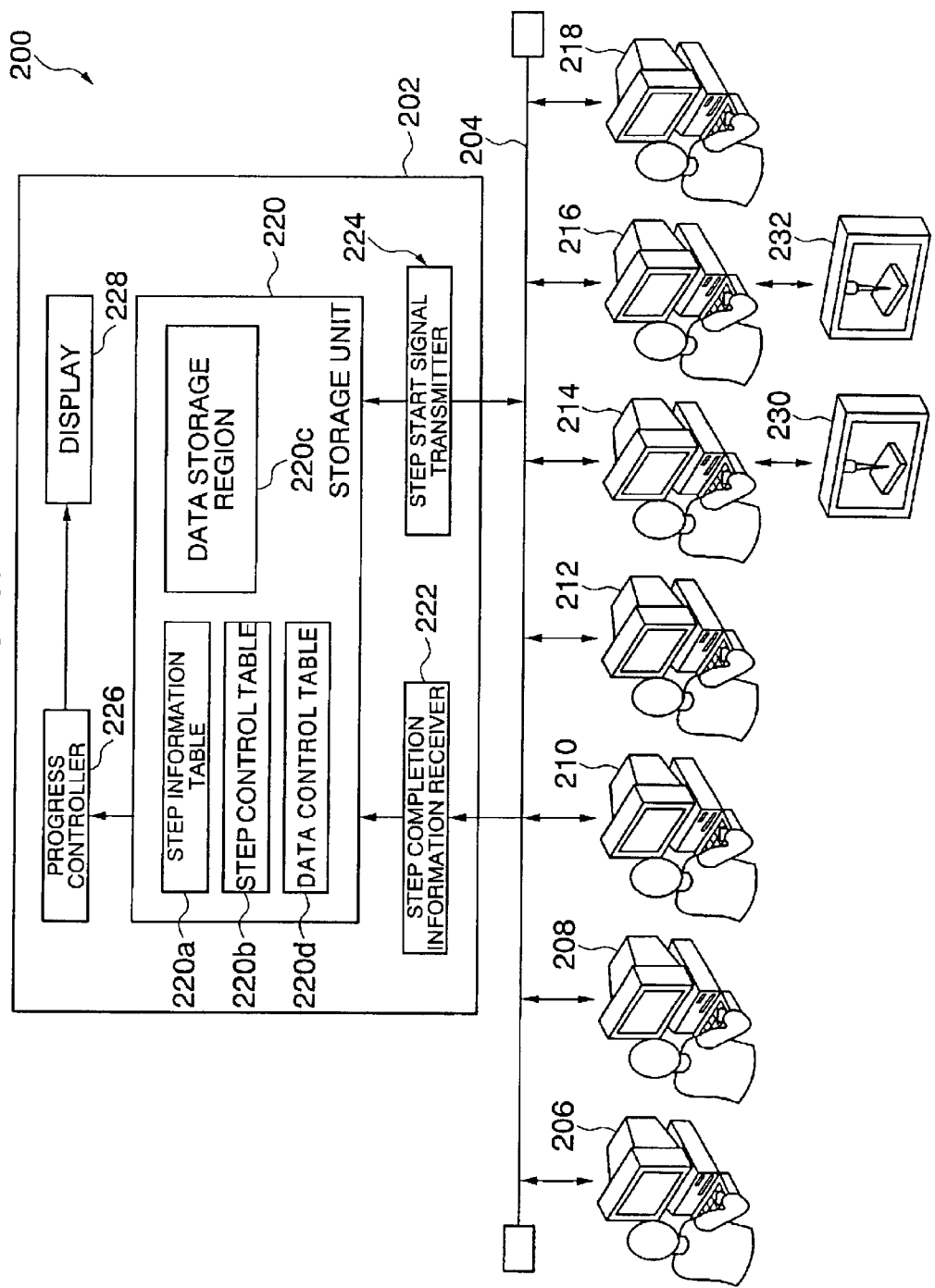

FIG.22

| STEP | WORK CONTENT | INFORMATION REQUIRED |
|---|---|---|
| MOLD SPECIFICATION DETERMINATION (P1) | PREPARE MOLD SPECIFICATIONS | DRAWINGS |
| MOLD DESIGN (P2) | PREPARE CORE SHAPE DATA | MOLD SPECIFICATIONS |
| | PREPARE CAVITY SHAPE DATA | |
| CORE NC DATA PREPARATION (P3) | PREPARE CORE NC DATA | CORE SHAPE DATA |
| CAVITY NC DATA PREPARATION (P4) | PREPARE CAVITY NC DATA | CAVITY SHAPE DATA |
| CORE MACHINING (P5) | MACHINE CORE | CORE NC DATA |
| CAVITY MACHINING (P6) | MACHINE CAVITY | CAVITY NC DATA |
| MOLD ASSEMBLY (P7) | ASSEMBLE CORE AND CAVITY INTO MOLD | CORE MACHINED ARTICLE NO. |
| | | CAVITY MACHINED ARTICLE NO. |

CONTENT OF STEP INFORMATION TABLE 220A

FIG.23

| ORDER NO. | MOLD SPECIFICATION DETERMINATION (P1) | MOLD DESIGN (P2) | CORE NC DATA PREPARATION (P3) | CAVITY NC DATA PREPARATION (P4) | CORE MACHINING (P5) | CAVITY MACHINING (P6) | MOLD ASSEMBLY (P7) |
|---|---|---|---|---|---|---|---|
| 1 | COMPLETE | COMPLETE | COMPLETE | COMPLETE | COMPLETE | COMPLETE | INCOMPLETE |
| 2 | COMPLETE | COMPLETE | COMPLETE | COMPLETE | INCOMPLETE | INCOMPLETE | INCOMPLETE |
| 3 | COMPLETE | COMPLETE | COMPLETE | COMPLETE | INCOMPLETE | INCOMPLETE | INCOMPLETE |
| 4 | COMPLETE | COMPLETE | COMPLETE | INCOMPLETE | INCOMPLETE | INCOMPLETE | INCOMPLETE |
| 5 | COMPLETE | INCOMPLETE | INCOMPLETE | INCOMPLETE | INCOMPLETE | INCOMPLETE | INCOMPLETE |
| 6 | INCOMPLETE | INCOMPLETE | INCOMPLETE | INCOMPLETE | INCOMPLETE | INCOMPLETE | INCOMPLETE |

CONTENT OF STEP CONTROL TABLE 220B

FIG.24

| Order No. | Drawing | Mold Specifications | Core Shape Data | Cavity Shape Data | Core NC Data | Cavity NC Data |
|---|---|---|---|---|---|---|
| 1 | ✓ | ✓ | ✓ | ✓ | ✓ | ✓ |
| 2 | ✓ | ✓ | ✓ | ✓ | ✓ | ✓ |
| 3 | ✓ | ✓ | ✓ | ✓ | ✓ | |
| 4 | ✓ | ✓ | ✓ | ✓ | | |
| 5 | ✓ | ✓ | | | | |
| 6 | ✓ | | | | | |

CONTENT OF DATA STORAGE REGION 220C

FIG.25

| ORDER NO. | DRAWING | MOLD SPECIFI- CATIONS | CORE SHAPE DATA | CAVITY SHAPE DATA | CORE NC DATA | CAVITY NC DATA | CORE MACHINED ARTICLE NO. | CAVITY MACHINED ARTICLE NO. | PART NO. |
|---|---|---|---|---|---|---|---|---|---|
| 1 | a:¥fig¥fig1.bmp | a:¥spec¥spec1.txt | a:¥kata¥core1.dat | a:¥kata¥cavi1.dat | a:¥nc¥nccore1.dat | a:¥nc¥nccavi1.dat | core1 | cavi1 | |
| 2 | a:¥fig¥fig2.bmp | a:¥spec¥spec2.txt | a:¥kata¥core2.dat | a:¥kata¥cavi2.dat | a:¥nc¥nccore2.dat | a:¥nc¥nccavi2.dat | | | |
| 3 | a:¥fig¥fig3.bmp | a:¥spec¥spec3.txt | a:¥kata¥core3.dat | a:¥kata¥cavi3.dat | a:¥nc¥nccore3.dat | | | | |
| 4 | a:¥fig¥fig4.bmp | a:¥spec¥spec4.txt | a:¥kata¥core4.dat | a:¥kata¥cavi4.dat | | | | | |
| 5 | a:¥fig¥fig5.bmp | a:¥spec¥spec5.txt | | | | | | | |
| 6 | a:¥fig¥fig6.bmp | | | | | | | | |

CONTENT OF DATA CONTROL TABLE 220D

FIG.26

| ORDER NO. | | 6/1 | 6/2 | 6/3 | 6/4 | 6/5 | 6/6 | 6/7 | 6/8 | 6/9 | 6/10 | 6/11 | 6/12 | 6/13 | 6/14 | 6/15 | 6/16 | 6/17 | 6/18 | 6/19 | 6/20 | 6/21 | 6/22 | 6/23 | 6/24 | 6/25 | 6/26 | 6/27 |
|---|---|---|---|---|---|---|---|---|---|---|---|---|---|---|---|---|---|---|---|---|---|---|---|---|---|---|---|---|
| 1 | PLANS | MOLD SPECIFICATION DETERMINATION | | | MOLD DESIGN | | | | | CORE NC DATA PREPARATION | MACHINE CORE | | | MOLD ASSEMBLY | | | | | | | | | | | | | |
| | RESULTS | MOLD SPECIFICATION DETERMINATION | | | MOLD DESIGN | | | | | CORE NC DATA PREPARATION | MACHINE CORE | | | | | | | | | | | | | | | | |
| | | | | | | | | | | CAVITY NC DATA PREPARATION | MACHINE CAVITY | | | | | | | | | | | | | | | | |
| 2 | PLANS | | | MOLD SPECIFICATION DETERMINATION | | | MOLD DESIGN | | | | CORE NC DATA PREPARATION | MACHINE CORE | | | MOLD ASSEMBLY | | | | | | | | | | | | |
| | | | | | | | | | | CAVITY NC DATA PREPARATION | MACHINE CAVITY | | | | | | | | | | | | | | | | |
| | RESULTS | | | MOLD SPECIFICATION DETERMINATION | | | MOLD DESIGN | | | | CORE NC DATA PREPARATION | MACHINE CORE | | | | | | | | | | | | | | | |
| | | | | | | | | | | CAVITY NC DATA PREPARATION | MACHINE CAVITY | | | | | | | | | | | | | | | | |
| 3 | PLANS | | | | | MOLD SPECIFICATION DETERMINATION | | | MOLD DESIGN | | | | CORE NC DATA PREPARATION | MACHINE CORE | | | MOLD ASSEMBLY | | | | | | | | | | |
| | | | | | | | | | | | | | CAVITY NC DATA PREPARATION | MACHINE CAVITY | | | | | | | | | | | | | |
| | RESULTS | | | | | MOLD SPECIFICATION DETERMINATION | | | MOLD DESIGN | | | CORE NC | | | | | | | | | | | | | | | |
| 4 | PLANS | | | | | | | MOLD SPECIFICATION DETERMINATION | | | MOLD DESIGN | | | | CORE NC DATA PREPARATION | MACHINE CORE | | | MOLD ASSEMBLY | | | | | | | | |
| | | | | | | | | | | | | | | | CAVITY NC DATA PREPARATION | MACHINE CAVITY | | | | | | | | | | | |
| | RESULTS | | | | | | | MOLD SPECIFICATION DETERMINATION | | | MOLD DESIGN | | | | | | | | | | | | | | | | |
| 5 | PLANS | | | | | | | | | MOLD SPECIFICATION DETERMINATION | | | MOLD DESIGN | | | | CORE NC DATA PREPARATION | MACHINE CORE | | | MOLD ASSEMBLY | | | | | | |
| | | | | | | | | | | | | | | | | | CAVITY NC DATA PREPARATION | MACHINE CAVITY | | | | | | | | | |
| | RESULTS | | | | | | | | | MOLD SPECIFICATION DETERMINATION | | | | | | | | | | | | | | | | | |
| 6 | PLANS | | | | | | | | | | | MOLD SPECIFICATION DETERMINATION | | | MOLD DESIGN | | | | CORE NC DATA PREPARATION | MACHINE CORE | | | MOLD ASSEMBLY | | | | |
| | | | | | | | | | | | | | | | | | | | CAVITY NC DATA PREPARATION | MACHINE CAVITY | | | | | | | | |
| | RESULTS | | | | | | | | | | | | | | | | | | | | | | | | | | |

FIG.27

| UNPROCESSED TASK LIST | | |
|---|---|---|
| ORDER NO. | STEP | DATE RECEIVED |
| 6 | MOLD SPECIFICATION DETERMINATION | 2000/6/13 |

FIG.28

| STEP | MOLD SPECIFICATION DETERMINATION |
|---|---|
| ORDER NO. | 6 |

| REQUIRED INFORMATION LIST | |
|---|---|
| REQUIRED INFORMATION | LOCATION |
| DRAWING | a:¥fig¥fig6.bmp |

| WORK ITEM LIST | |
|---|---|
| WORK ITEM | LOCATION |
| PREPARE MOLD SPECIFICATIONS | a:¥spec¥spec6.txt |

FIG.29

| UNPROCESSED TASK LIST | | |
|---|---|---|
| ORDER NO. | STEP | DATE RECEIVED |
| 5 | MOLD DESIGN | 2000/6/10 |

FIG.30

| UNPROCESSED TASK LIST | | |
|---|---|---|
| ORDER NO. | STEP | DATE RECEIVED |
| 4 | CORE NC DATA PREPARATION | 2000/6/8 |

FIG.31

| UNPROCESSED TASK LIST | | |
|---|---|---|
| ORDER NO. | STEP | DATE RECEIVED |
| 3 | CAVITY NC DATA PREPARATION | 2000/6/5 |
| 4 | CAVITY NC DATA PREPARATION | 2000/6/8 |

FIG.32

| UNPROCESSED TASK LIST | | |
|---|---|---|
| ORDER NO. | STEP | DATE RECEIVED |
| 2 | CORE MACHINING | 2000/6/3 |
| 3 | CORE MACHINING | 2000/6/5 |

FIG.33

| UNPROCESSED TASK LIST | | |
|---|---|---|
| ORDER NO. | STEP | DATE RECEIVED |
| 2 | CAVITY MACHINING | 2000/6/3 |

FIG.34

| UNPROCESSED TASK LIST | | |
|---|---|---|
| ORDER NO. | STEP | DATE RECEIVED |
| 1 | MOLD ASSEMBLY | 2000/6/1 |

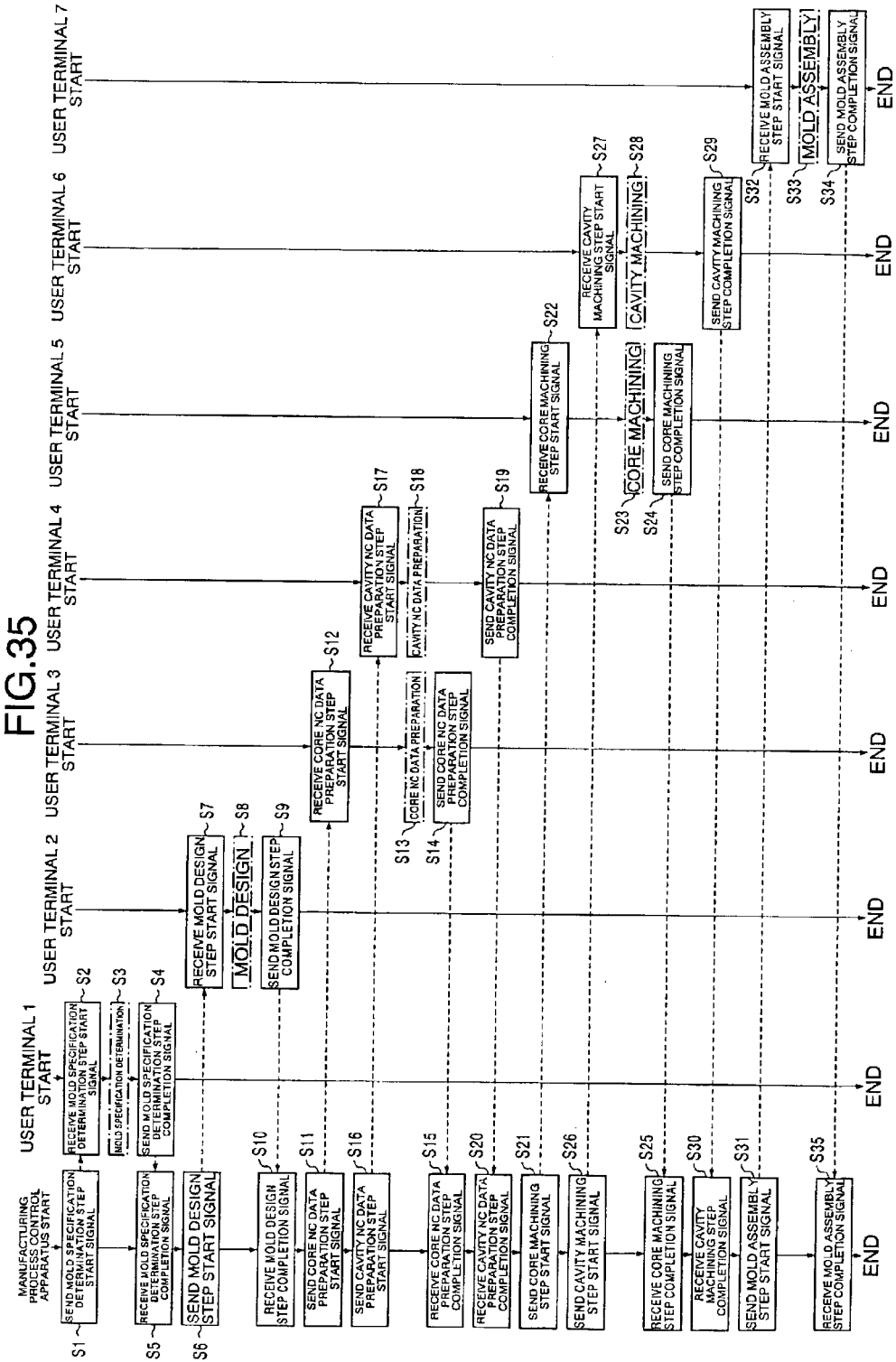

METHOD AND DEVICE FOR EXECUTING WORK CONSISTING OF A PLURALITY OF STEPS UNDER COMPUTER CONTROL

This is a Continuation Application under 35 U.S.C. §120 of International Application PCT/JP01/03944 filed May 11, 2001.

BACKGROUND OF THE INVENTION

1. Field of the Invention

The present invention relates to a method of executing a plurality of steps that are performed sequentially in temporal order under computer control.

2. Background

The design of molds used in the injection molding of plastic and molds used in the casting of cast parts had previously required skilled work in determining the shape of the cavity used to form the mold from the design drawings for the product, and in providing slide cores and loose cores for undercut areas and opening areas. Recently, with the appearance of three-dimensional CAD, it is possible to obtain product design values as 3D digital data. If the product design values are obtained as 3D digital data, it is possible to determine the shapes of mold cavities from that 3D digital data, thereby greatly simplifying mold design. However, even if mold design is performed using 3D digital data, the current situation is such that many items that require the work of skilled workers still remain, including the design of slide cores and loose cores to handle complex product shapes.

One proposal is to divide the design work process into a plurality of steps and assign each step by specialty to a different worker, but with such a division of labor, it takes time and effort to pass work along, so it is difficult to reduce the number of days required for design. In addition, even after the design of the mold is completed, there is no guarantee that the work of preparing numerical control data (NC data) for the fabrication of molds based on the design data, and the work of machining the molds will be performed efficiently and without delay. Accordingly, the design and fabrication of molds was a problem that required a large amount of time extending to several months.

In addition, not restricting ourselves to the design and fabrication of molds, when any work consisting of a plurality of steps is performed consecutively in a specific order, the establishment of coordination among the various steps is necessary for the work to be performed efficiently.

SUMMARY OF THE INVENTION

The present invention was accomplished in light of the aforementioned circumstances and has as its fundamental object to provide a method whereby, when work consisting of a plurality of steps is performed sequentially, that work can be performed efficiently under computer control.

Another object of the present invention is to provide a method of designing and fabricating molds that can be performed easily without particular reliance on skilled workers.

In order to achieve the aforementioned objects, the present invention provides a method whereby work consisting of a plurality of steps performed sequentially is executed under computer control. This method uses a central processing computer and a plurality of terminal computers, where each of the plurality of steps is executed by one of the respective terminal computers. Moreover, when one terminal computer assigned to a single step has completed the work in the step assigned to it and is able to execute the work in the next step, that one terminal computer sends a work completion signal to the central processing computer. The central processing computer receives this work completion signal and prepares a work item notice that indicates that it is possible to start the next step that is to be performed next after this one step such that it can be displayed on the screen of the terminal computer used for the next step which is to be assigned to the next step. The terminal computer used for the next step allows the work item notice displayed on its display screen to be clicked to start work on the next step assigned to it.

In the event that one step among the plurality of steps includes a plurality of tasks that can be performed in parallel, the central processing computer recognizes from the steps prior to this one step that this one step contains a plurality of tasks that can be performed in parallel, and when a work completion signal arrives from the terminal computer assigned to the step immediately prior to this one step, it can generate a number of work item notices corresponding to the plurality of tasks.

In one preferred embodiment, the present invention provides a method of performing the design and fabrication of molds using a central processing computer that stores three-dimensional digital data that represents the product shape, and a plurality of computer terminal units connected to this central processing computer via communication lines. This method comprises: a step of calling up three-dimensional digital data describing the product shape from said central processing computer to a first computer terminal unit, performing a three-dimensional display of the product shape on the screen of said first computer terminal unit, determining a partition line between the upper and lower mold halves based on said screen display, confirming the partition surface between the upper and lower mold halves along said partition line and the mold formation surface shapes of the upper and lower mold halves, respectively, and sending same to said central processing computer where it is saved as digital data, a step of calling up three-dimensional digital data describing the product shape including the digital data formed in said first computer terminal unit from said central processing computer to a second computer terminal unit, performing a three-dimensional display of the product shape on the screen of said second computer terminal unit, determining the locations where slide cores are necessary and the slide direction, and, based on the size of the slide cores needed at the various locations, selecting ones from among a plurality of standard core blocks of different sizes and shapes that are prepared in advance and thus determining the slide core block to be used, placing this slide core block on the outside of the molding surface in said slide direction, and when the slide block is placed, drawing slide pockets required for the sliding of said slide block in the upper and lower mold halves, respectively, providing slide cores of a shape determined based on the shape of the molding surface at the tip in the slide direction of the slide core, and sending same to said central processing computer where it is saved as digital data, a step of calling up three-dimensional digital data describing the product shape including the digital data formed in said second computer terminal unit from said central processing computer to a third computer terminal unit, performing a three-dimensional display of the product shape on the screen of said third computer terminal unit, determining the locations where a loose core is necessary, and, based on the size of the loose cores needed at the various locations, selecting ones from among a plurality of standard core blanks of different sizes and shapes that are prepared in advance and thus determining the core blank to be used, placing this core blank at the stipulated position on the molding surface, determining the shape of the tip of the loose core based on shape data for the molding surface, and sending same to said central processing computer where it is saved as digital data, a step of calling up three-dimensional digital data describing the product shape including the digital data formed in said third computer terminal unit from said central processing computer to a fourth computer terminal unit, performing a three-dimensional display of the product shape on the screen of said fourth computer terminal unit, determining the locations of ejector pins, determining the length of the ejector pins from the ejector pin locations and the molding surface shape, and sending same to said central processing computer where it is saved as digital data, a step of calling up the various data determined above from said central processing computer, preparing numerical control data for mold fabrication based on said data, and sending said numerical control data to said central processing computer where it is saved, and a step of getting said numerical control data from said central processing computer and fabricating a mold.

In another preferred embodiment, the present invention provides a method of performing the design and fabrication of molds using a central processing computer that stores three-dimensional digital data that represents the product shape, and a plurality of computer terminal units connected to this central processing computer via communication lines. This method comprises: a step of calling up three-dimensional digital data describing the product shape from said central processing computer to a first computer terminal unit, performing a three-dimensional display of the product shape on the screen of said first computer terminal unit, determining a partition line between the upper and lower mold halves based on said screen display, confirming the partition surface between the upper and lower mold halves along said partition line and the mold formation surface shapes of the upper and lower mold halves, respectively, and sending same to said central processing computer where it is saved as digital data, a step of calling up three-dimensional digital data describing the product shape including the digital data formed in said first computer terminal unit from said central processing computer to a second computer terminal unit, performing a three-dimensional display of the product shape on the screen of said second computer terminal unit, determining the locations where insert cores are necessary, and, based on the size of the insert cores needed at the various locations, selecting ones from among a plurality of standard core blocks of different sizes and shapes that are prepared in advance, providing insert cores of the size and shape required, and sending same to said central processing computer where it is saved as digital data, a step of calling up three-dimensional digital data describing the product shape including the digital data formed in said second computer terminal unit from said central processing computer to a third computer terminal unit, performing a three-dimensional display of the product shape on the screen of said third computer terminal unit, determining the locations of ejector pins, determining the length of the ejector pins from the ejector pin locations and the molding surface shape, and sending same to said central processing computer where it is saved as digital data, a step of calling up the various data determined above from said central processing computer, preparing numerical control data for mold fabrication based on said data, and sending said numerical control data to said central processing computer where it is saved, and a step of getting said numerical control data from said central processing computer and fabricating a mold. In this case, an insert core may be a slide core or loose core.

In the method according to this preferred embodiment, each of the computer terminal units may send work completion signals to the central processing computer when the step assigned to it is completed, and upon receiving a completion signal for each step, the central processing computer may prepare a work item notice that indicates that it is possible to start the next step that is to be performed next after this one step such that it can be displayed on the screen of the terminal computer which is to be assigned to the next step. The terminal computer assigned to the next step may allow the displayed work item notice to be clicked to start work on the next step assigned to it. The step of forming digital data for cores may include the work of preparing digital data for a plurality of cores, and the central processing computer may be able to display a number of work item notices corresponding to the number of cores on the same number of computer terminal units.

The step of preparing numerical control data may include the tasks of preparing digital data for a plurality of parts, and the central processing computer may be able to display a number of work item notices corresponding to the number of tasks on the same number of computer terminal units.

In the present invention, a step of calling up three-dimensional digital data describing the product shape from said central processing computer to a computer terminal unit, performing a three-dimensional display of the product shape on the screen of said first computer terminal unit, using an exposure device to expose ultraviolet curing resin based on said three-dimensional digital data to create a stereolithographic model as a model of the product, and if the product consists of two or more parts that are assembled, using this stereolithographic model to confirm that there is no problem with it in the assembled state is performed prior to the step performed by said first computer.

In still another preferred embodiment, the present invention provides an apparatus whereby work consisting of a plurality of steps performed sequentially is executed under computer control, comprising: a central processing computer and a plurality of terminal computers, each of which executes one of said plurality of steps, wherein: when one of said terminal computers assigned to a single step has completed the work in the step assigned to it and is able to execute the work in the next step, that one terminal computer transmits a work completion signal, said central processing computer receives this work completion signal and prepares a work item notice that indicates that it is possible to start the next step that is to be performed next after this one step such that it can be displayed on the screen of the terminal computer used for said next step which is to be assigned to the next step, and said terminal computer used for the next step allows the work item notice displayed on its display screen to be clicked to start work on said next step assigned to it.

In still another embodiment, the present invention provides a manufacturing process control apparatus that controls a manufacturing process divided into a plurality of steps that are controlled by a plurality of user terminals, comprising: transmitting means that, when conditions for the execution of one step of said plurality of steps are met, transmits to the user terminal that controls said one step information (a signal) to the effect that said step can be started, and receiving means that, when said one step of the plurality of steps is complete, receives from the user terminal that controls said one step information (a signal) to the effect that said one step is complete.

Here, the control of steps is defined to include when the user terminal itself executes the work contained within a step, along with when work contained within that step is performed by other equipment connected to the user terminal.

Moreover, "when conditions for the execution of one step are met" means when the data required to execute the work contained in that step and other information is all present and usable.

This apparatus preferably further comprises: a first storage means that stores information required to execute said plurality of steps, wherein: based on information stored in said first storage means, said transmitting means determines whether or not the conditions for the execution of one step of said plurality of steps are met. In addition, when the conditions for the execution of one step are met, said transmitting means transmits to the user terminal to execute said one step information required for the execution of said one step. Moreover, when one step is complete, said receiving means receives from the user terminal that executed said one step the information generated in said one step, and stores said information in said first storage means.

Moreover, the apparatus preferably comprises: a second storage means that stores information to the effect that one step is complete that is received by said receiving means, and progress control means that controls the progress of the manufacturing process based on the information stored in said second storage means.

In still another embodiment, the present invention provides a manufacturing process control method for controlling a manufacturing process divided into a plurality of steps that are controlled by a plurality of user terminals, comprising: a transmitting step whereby, when conditions for the execution of one step of said plurality of steps are met, information (a signal) to the effect that said step can be started is transmitted to the user terminal that controls said one step, and a receiving step whereby, when said one step of the plurality of steps is complete, information (a signal) to the effect that said one step is complete is received from the user terminal that controls said one step.

BRIEF DESCRIPTION OF THE DRAWINGS

FIG. 15 is a diagram showing one example of a work notice table for a terminal computer assigned to mold design.

FIG. 16(a) is a system diagram showing the entire mold design process, FIG. 16(b) is a system diagram showing the lower mold block design process, and FIG. 16(c) is a system diagram showing the upper mold block design process.

FIG. 18 is a diagram showing one example of a work notice table for a terminal computer assigned to prepare numerical control data.

FIG. 19 is a diagram showing one example of a work disclosure table for a terminal computer assigned to the mold machining step.

FIG. 21 is a diagram schematically showing the constitution of the manufacturing process control system of Preferred Embodiment 2 of the present invention.

FIG. 22 is a diagram showing the contents of the step information table of the manufacturing process control apparatus of Preferred Embodiment 2 of the present invention.

FIG. 23 is a diagram showing the contents of the step control table of the manufacturing process control apparatus of Preferred Embodiment 2 of the present invention.

FIG. 24 is a diagram showing the contents of the data storage region of the manufacturing process control apparatus of Preferred Embodiment 2 of the present invention.

FIG. 25 is a diagram showing the contents of the data control table of the manufacturing process control apparatus of Preferred Embodiment 2 of the present invention.

FIG. 26 is a diagram showing a chart displayed by the progress control block of the manufacturing process control apparatus of Preferred Embodiment 2 of the present invention.

FIG. 27 is an example of the unprocessed task list screen which displays a list of unprocessed tasks controlled by the first user terminal of Preferred Embodiment 2 of the present invention.

FIG. 28 is an example of a step information screen.

FIG. 29 is an example of the unprocessed task list screen which displays a list of unprocessed tasks currently controlled by the second user terminal of Preferred Embodiment 2 of the present invention.

FIG. 30 is an example of the unprocessed task list screen which displays a list of unprocessed tasks currently controlled by the third user terminal of Preferred Embodiment 2 of the present invention.

FIG. 31 is an example of the unprocessed task list screen which displays a list of unprocessed tasks currently controlled by the fourth user terminal of Preferred Embodiment 2 of the present invention.

FIG. 32 is an example of the unprocessed task list screen which displays a list of unprocessed tasks currently controlled by the fifth user terminal of Preferred Embodiment 2 of the present invention.

FIG. 33 is an example of the unprocessed task list screen which displays a list of unprocessed tasks currently controlled by the sixth user terminal of Preferred Embodiment 2 of the present invention.

FIG. 34 is an example of the unprocessed task list screen which displays a list of unprocessed tasks currently controlled by the seventh user terminal of Preferred Embodiment 2 of the present invention.

FIG. 35 is a flowchart showing the operation of the manufacturing process control system of Preferred Embodiment 2 of the present invention.

DETAILED DESCRIPTION OF THE PREFERRED EMBODIMENTS

Here follows a description of embodiments of the present invention made with reference to drawings. We will first describe the design and fabrication of molds used to manufacture a mobile phone cover, to which the present invention can be applied.

Preparatory Stage

Figure 1:
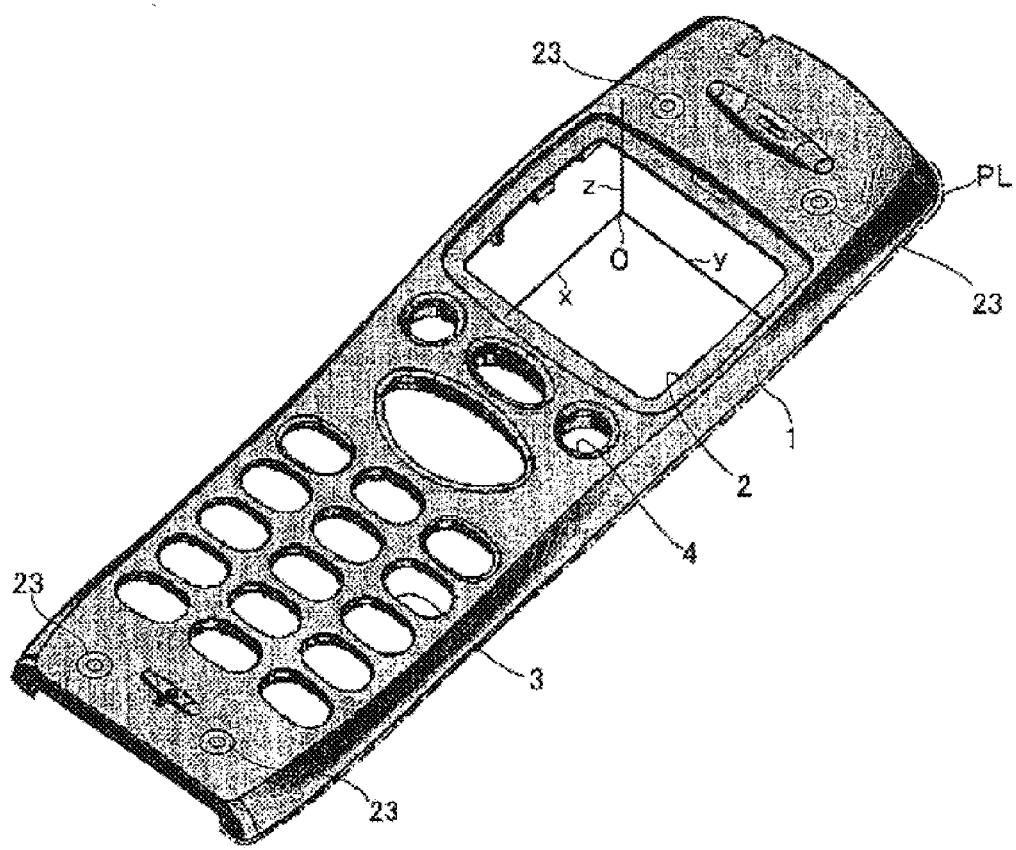
FIG. 1 is a perspective view showing the front cover of a mobile phone that could be manufactured by applying the method according to Preferred Embodiment 1 of the present invention.

FIG. 1 is a perspective view showing the shape of the front cover 1 of a mobile phone. The cover of a mobile phone consists of the front cover 1 shown in FIG. 1 and a back cover (not shown) which fits onto this front cover 1. Digital design data that represents the shape of the front cover 1 and the back cover are prepared by a three-dimensional CAD program. Three-dimensional CAD programs currently in wide use include CATIA, UG, Pro/E, I-DEAS and others. Any of these three-dimensional CAD programs can be used to design the cover of a mobile phone. As shown in FIG. 1, the front cover 1 has a window hole 2 for attaching a liquid crystal display, holes 3 for fitting the number buttons, the # button and the * button, and holes 4 for other buttons on the front side. Moreover, while this is not shown clearly in FIG. 1, a lateral opening is formed on the side of the front cover 1. A plurality of projections and ribs and the like is formed on the back side, and undercuts are formed in a number of places that would be obstacles to releasing from the mold when the front cover 1 is manufactured by injection molding of plastic.

The three-dimensional shape of the front cover 1 shown in FIG. 1 can be displayed on a computer screen based on the digital design data. In the preparatory stage for mold design, ultraviolet curing resin is exposed based on this digital design data to create a stereolithographic model. Creating a stereolithographic model from ultraviolet curing resin by exposing the ultraviolet curing resin based on three-dimensional digital design data is a known process, so we shall omit any further detailed description. In this preferred embodiment, a similar stereolithographic model of the back cover is created in addition to the stereolithographic model of the front cover 1. Moreover, the fit between the stereolithographic model of the front cover 1 and the stereolithographic model of the back cover is checked to confirm that there are no errors in the design data for the front cover 1 and back cover. This is to avert the possibility of wastefully creating a mold by performing the mold design and fabrication process even though there were errors in the product design data but they were not noticed.

Once the stereolithographic model is used to confirm that there are no errors in the product design data, the preparatory stage for mold design is complete.

Determining the Mold Partition Surface and Identifying Mold Blocks

In this preferred embodiment, the first step of mold design is determining the mold partition surface, or namely the partition surface between the upper mold and the lower mold. The mold partition surface is most typically determined by following the line connecting the points on the furthermost outside edge in the outer shape of the product. Taking a specific point on the product as the origin O, as shown in FIG. 1, the x-axis is set in the length direction of the product, the y-axis is set in the width direction of the product, and the z-axis is set in the vertical direction, and by representing the points on the outside surface of the product through which the mold partition surface passes as coordinates, it is possible to determine the position of the mold partition surface as coordinates. This mold partition surface can be displayed on a screen display showing the shape of the product as a candidate mold partition line or partition line PL displayed in red or another specific color. One example of this is shown as a partial phantom line in FIG. 1.

In order to prevent the diagram from becoming difficult to see, the partition line PL is drawn in FIG. 1 separated from the image of the product, but on the actual computer screen, it is presented on the three-dimensional image representing the product. A computer program used to determine the mold partition surface may be constituted so that it displays not just one but a plurality of candidate partition lines.

If the candidate partition line displayed on the screen is satisfactory, then clicking on the "Accept" button displayed on the computer screen sets the plane following the displayed partition line PL as the partition surface. If the partition line displayed on the screen is not satisfactory, then clicking on the "Next Candidate" button on the screen display displays the second candidate partition line. By displaying several candidates in this manner, it is possible to determine the most preferable partition line PL.

Figure 2:
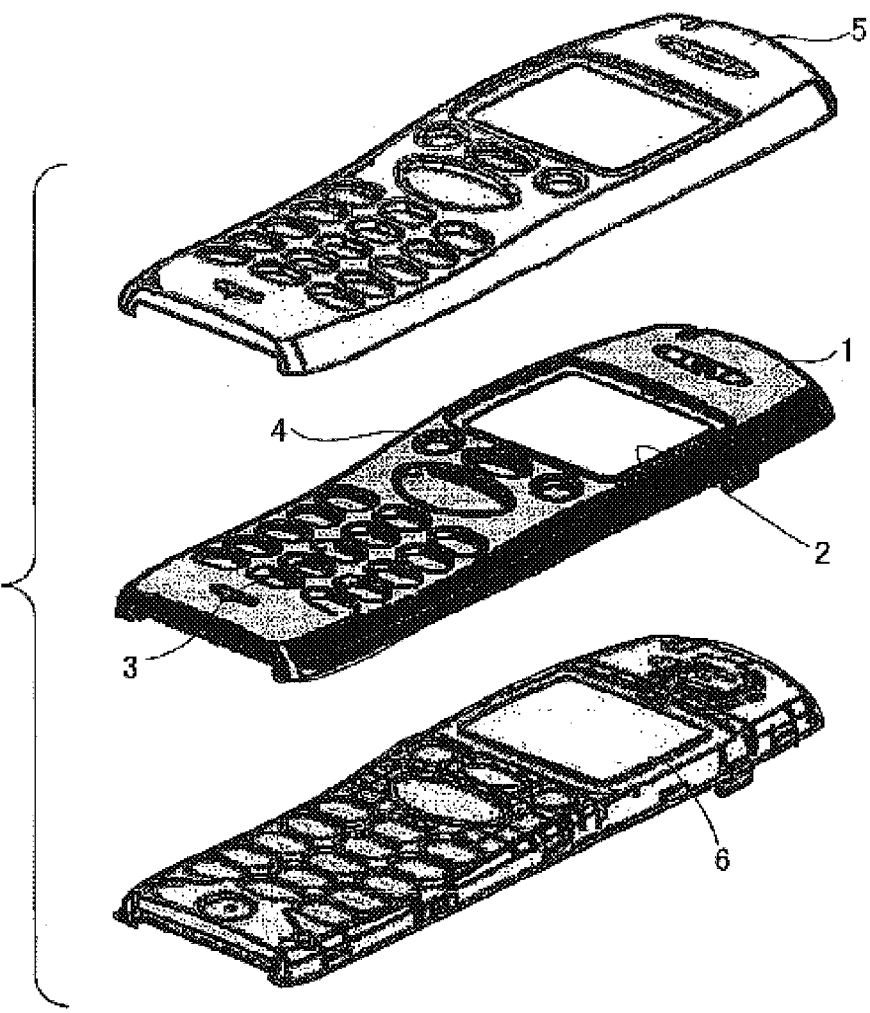
FIG. 2 is a perspective view showing the convex portions and concave portions used to form the upper mold and lower mold after partitioning the mold in the mold design process executed by applying the method according to Preferred Embodiment 1 of the present invention.

FIG. 2 is a perspective view showing the formation surface shapes to form the upper mold and lower mold after the determination of the partition line. In FIG. 2, the front cover 1 which is the product is shown in the center, above which is shown the concave portion 5 constituting the molding surface of the upper mold and below which is shown the convex portion 6 constituting the molding surface of the lower mold. The concave portion 5 of the upper mold and the convex portion 6 of the lower mold form the molding cavity between them when the upper and lower molds are closed.

Figure 3:
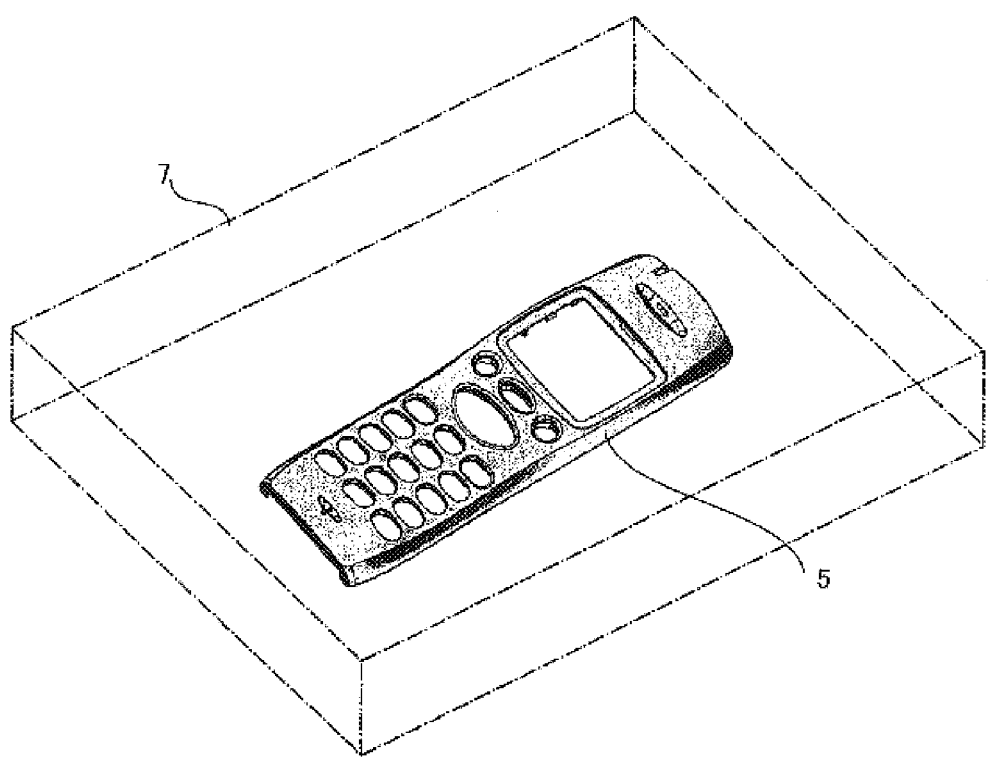
FIG. 3 is a perspective view showing the block determination stage for the upper mold.
Figure 4:
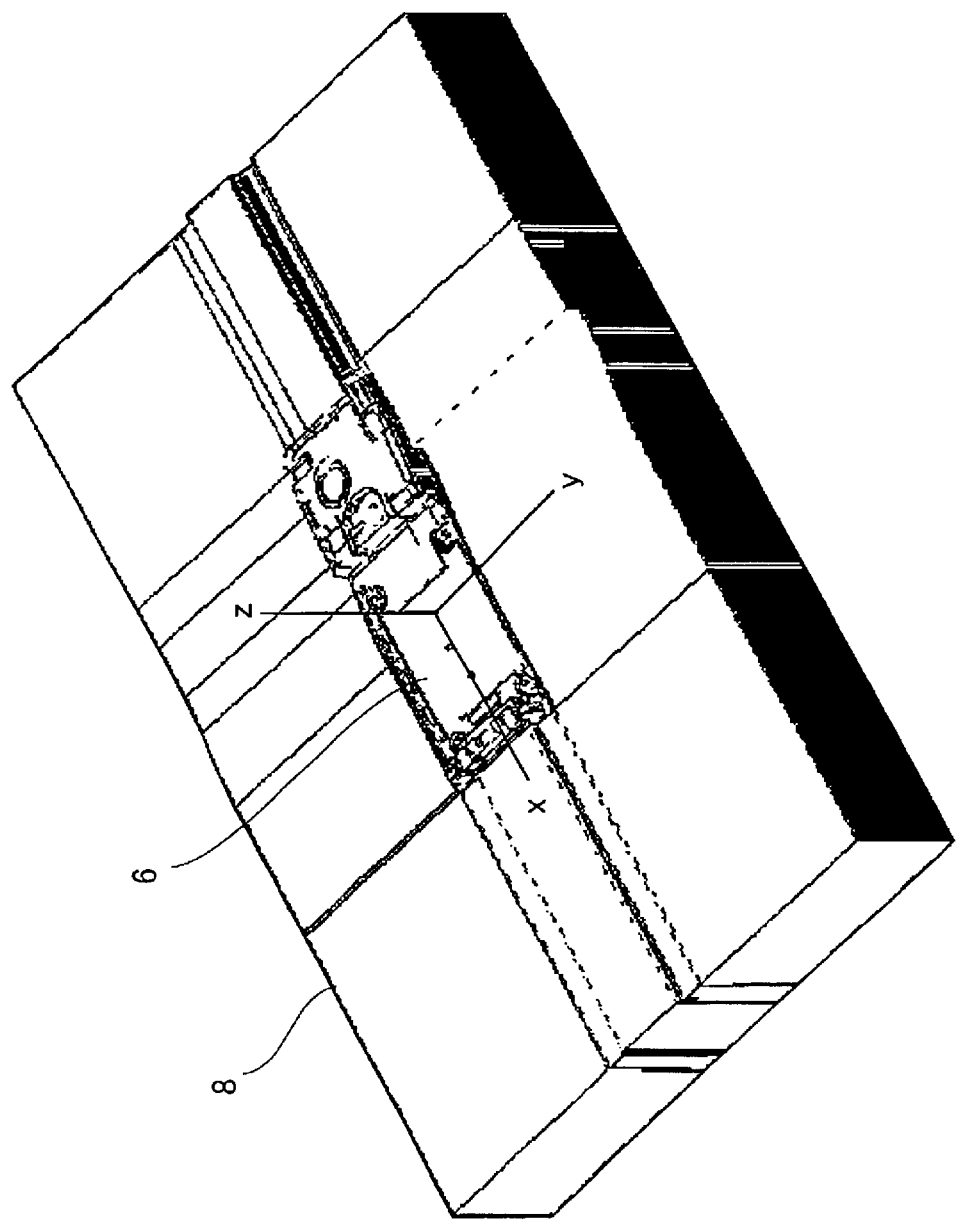
FIG. 4 is a perspective view showing the block determination stage for the lower mold.

Once the partition line PL is determined, the optimal mold blocks for the dimensions and shape of the concave portion 5 and convex portion 6 are automatically determined and displayed on the display screen. FIG. 3 is a diagram showing the state in which the concave portion 5 is formed in the mold block 7 of the upper mold. FIG. 4 is a diagram showing the state in which the convex portion 6 is formed in the mold block 8 of the lower mold. The determination of the mold blocks 7 and 8 for the upper and lower molds is performed by selecting from blocks of several different sizes and shapes the ones of the most suitable size and shape.

Placement of Slide Cores

Figure 5:
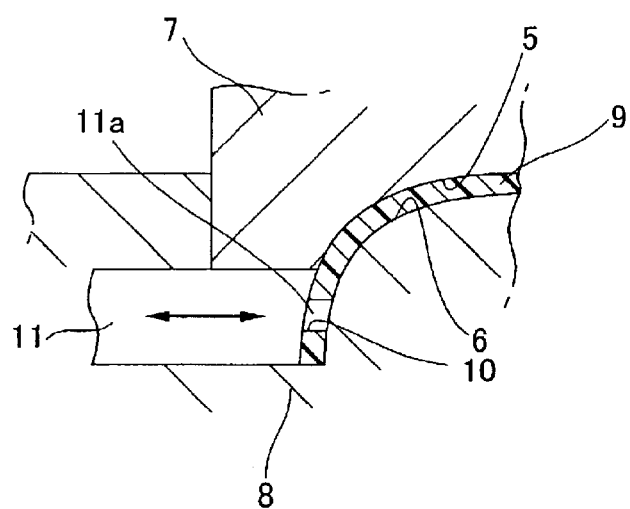
FIG. 5 is a cross-sectional view schematically showing a slide core.

If the product has holes in its side walls or other portions with shapes that hinder removal of the part from the mold, a slide core must be placed at that position. FIG. 5 illustrates the concept of the slide core. A molding cavity 9 is formed between the concave portion 5 of the upper mold block 7 and the convex portion 6 of the lower mold block 8, and molten plastic is injected into this molding cavity 9 and cooled and hardened to form a product. Here, if a hole 10 is to be formed in the side wall of the product, a slide 11 is placed such that it can be moved in the direction of the arrow. A core 11a used to mold the hole is formed on the tip of this slide 11, and this core 11a protrudes within the molding cavity 9. After the product is cooled and hardened, the upper mold block 7 is moved upward, and the slide 11 is moved in the withdrawal direction so that the product can be removed from the mold.

Figure 6:
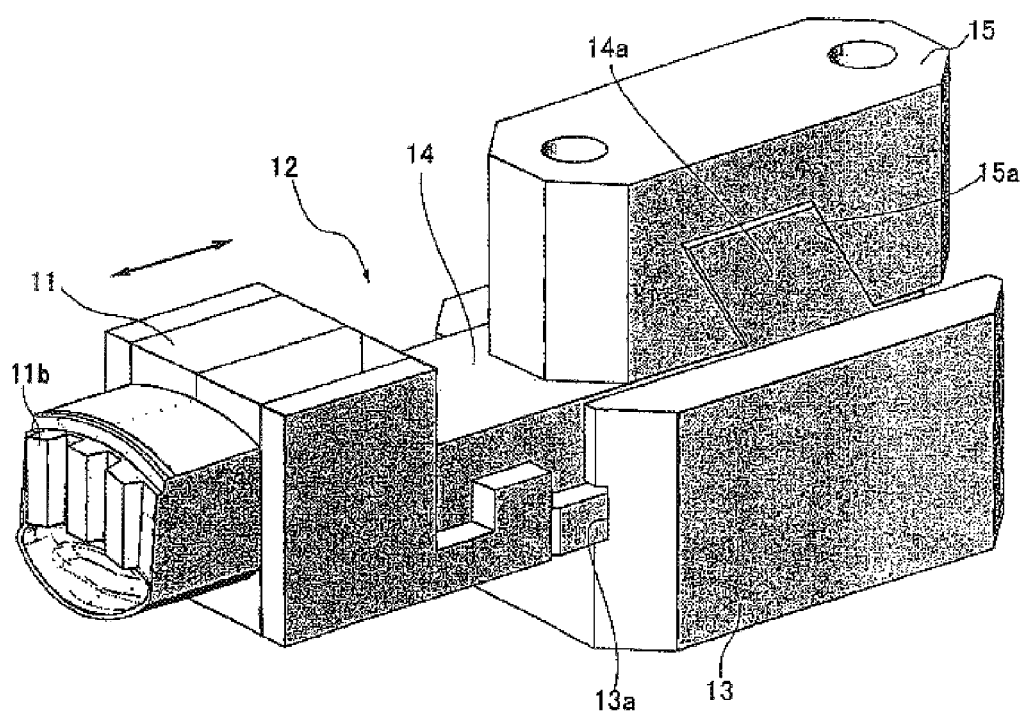
FIG. 6 is a perspective view showing one example of a slide unit.
Figure 7:
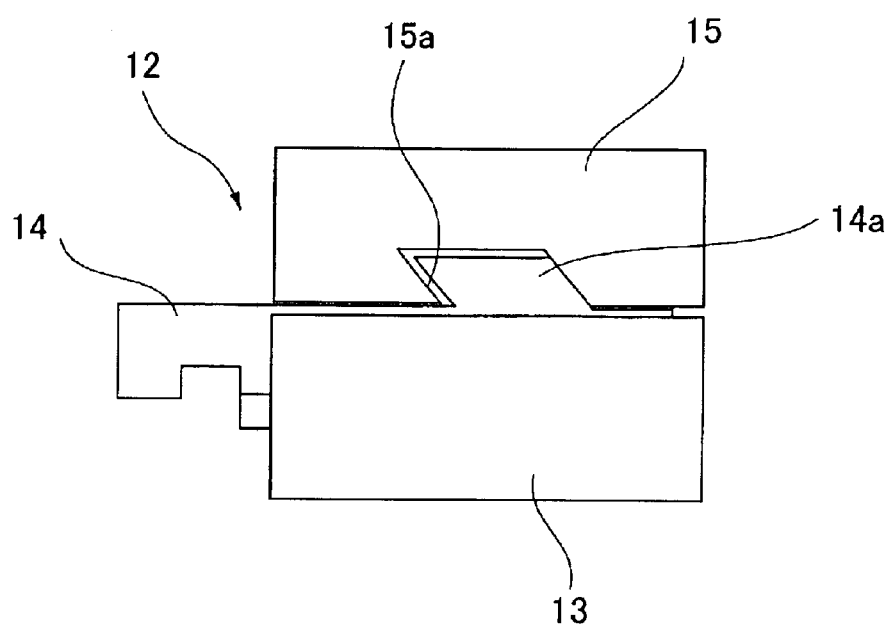
FIG. 7 is a side view of a slide unit.

In this preferred embodiment, one slide core is constituted by a slide unit 12 having the structure shown in FIG. 6 and FIG. 7. In FIG. 6, the slide unit 12 is provided with a slide guide 13 and this slide guide 13 is fixed to the lower mold block 8. A moveable member 14 is guided by a guide groove 13a within the slide guide 13 so that it moves in the direction indicated by the arrow. The slide 11 is removably fixed to the tip of this moveable member 14. A molding core 11b of a prescribed shape is formed on the tip of the slide 11. Moreover, the slide unit 12 is provided with a locking block 15 fixed to the upper mold block 7. As is clear from FIG. 7, the locking block 15 has an inclined cam groove 15a that is open at the bottom. The direction of inclination of the cam groove 15a is the direction such that it is further from the tip of the slide 11 toward the bottom. An inclined cam following member 14a that engages the cam groove 15a of the locking block 15 is formed on the upper surface of the moveable member 14.

Accordingly, in the state in which the upper mold block 7 is moved downward and fits against the lower mold block 8, the moveable member 14 and slide 11 are pushed out in the direction of the molding cavity 9 and the molding core 11b on the tip of the slide 11 is inserted to the prescribed position in the molding cavity 9. In addition, when the upper mold block 7 is raised upward, the moveable member 14 and slide 11 move in the withdrawal direction and the molding core 11b is withdrawn from the molding cavity 9.

Figure 8:
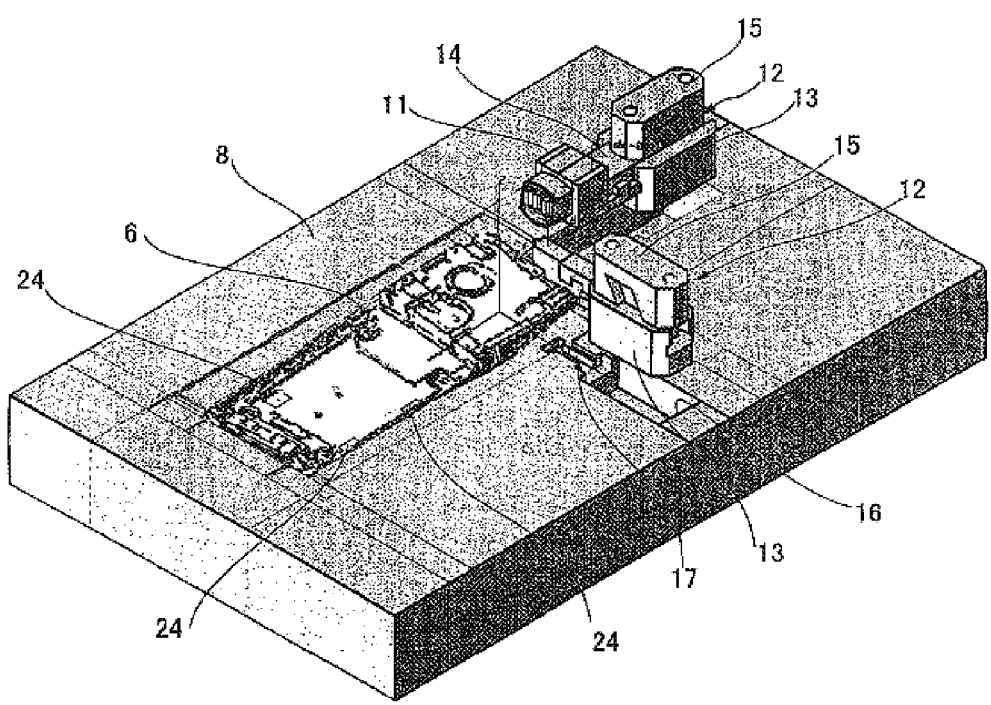
FIG. 8 is a perspective view showing the state of slide units placed on the lower mold block.

FIG. 8 shows the state of the mold used to form the mobile phone front cover 1 shown in FIG. 1 with the slide unit 12 being placed at the prescribed position of the lower mold block 8. The operation consists of first determining the prescribed size and type of the slide unit 12, and then moving the cursor to the prescribed position while watching the computer's display screen and clicking, thus executing this operation manually. The program loaded into the computer is constituted such that, when the size and type of the slide unit 12 are determined and the position is specified, a concave portion 16 for fitting the slide guide 13 and a groove 17 for the moveable member 14 and slide 11 to slide in are automatically drawn at the specified position on the lower mold block 8. The design related to the slide core in the lower mold block 8 is completed upon drawing the concave portion 16 for fitting the slide guide 13 and groove 17 for the moveable member 14 and slide 11 to slide in this lower mold block 8.

The design of the slide unit 12 is performed by a different operation. Standard parts are used for the slide guide 13, moveable member 14 and locking block 15 in the slide unit 12. To wit, several slide units with different sizes, shapes and types are prepared, and the most appropriate one is selected manual depending on the size and position of the molding core 11b required to mold the product. The result of this selection is also used to form the concave portion 16 and groove 17 in the lower mold block 8 described above. In the design of the slide unit 12, the combination of slide guide 13, moveable member 14 and locking block 15 is specified from among the standard parts. Moreover, the element for the slide 11 is selected to be of a size and shape such that it can engage the moveable member 14. Next, a molding core 11b of the prescribed shape and size is formed on the tip of this element. The molding core 11b is formed by computer processing based on information from design data for the front cover 1 which is the product.

Figure 9:
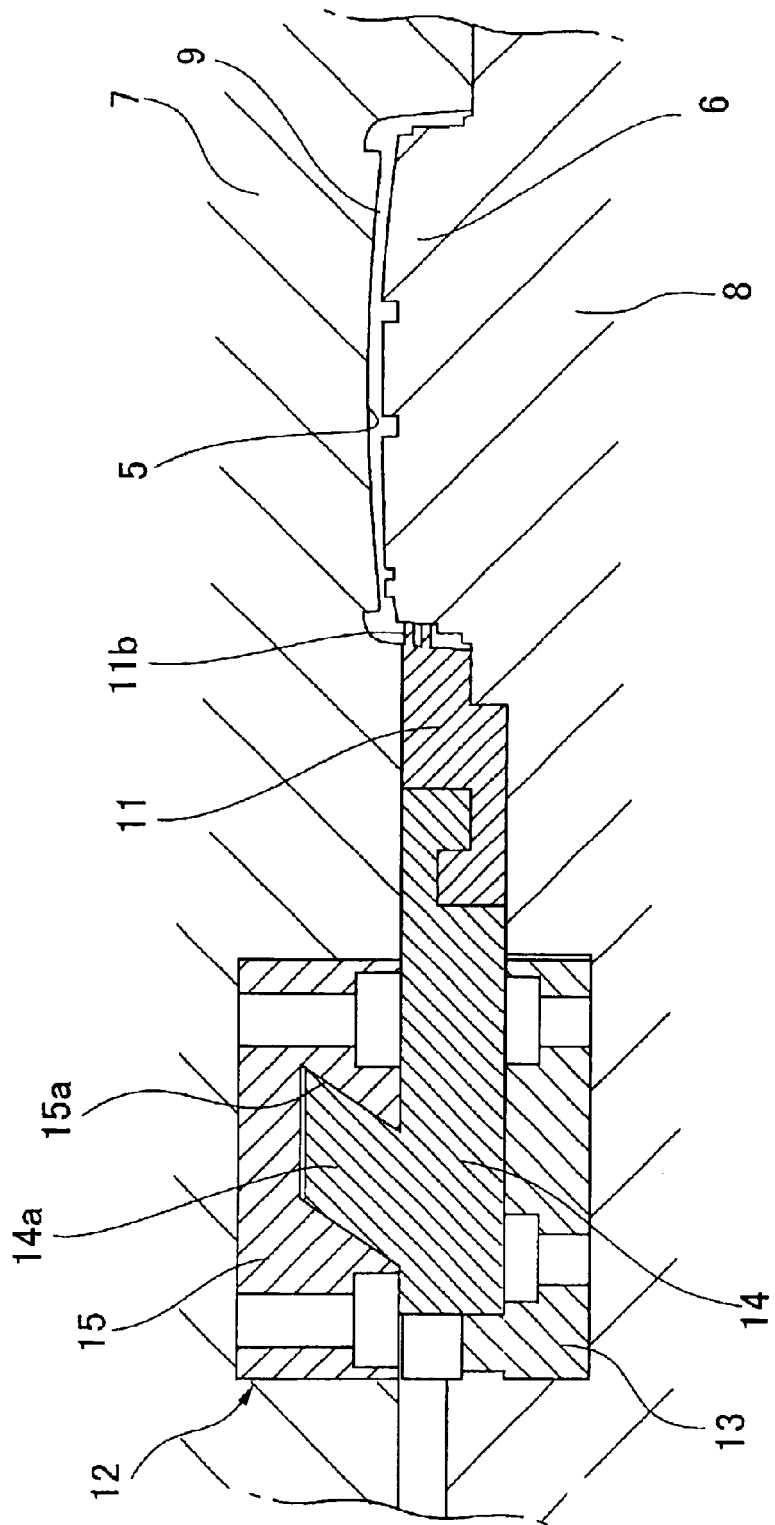
FIG. 9 is a cross-sectional view showing the state of a slide unit attached to the lower mold.

FIG. 9 shows a cross section with the slide unit 12 incorporated into the mold.

Placement of Loose Cores

Figure 10:
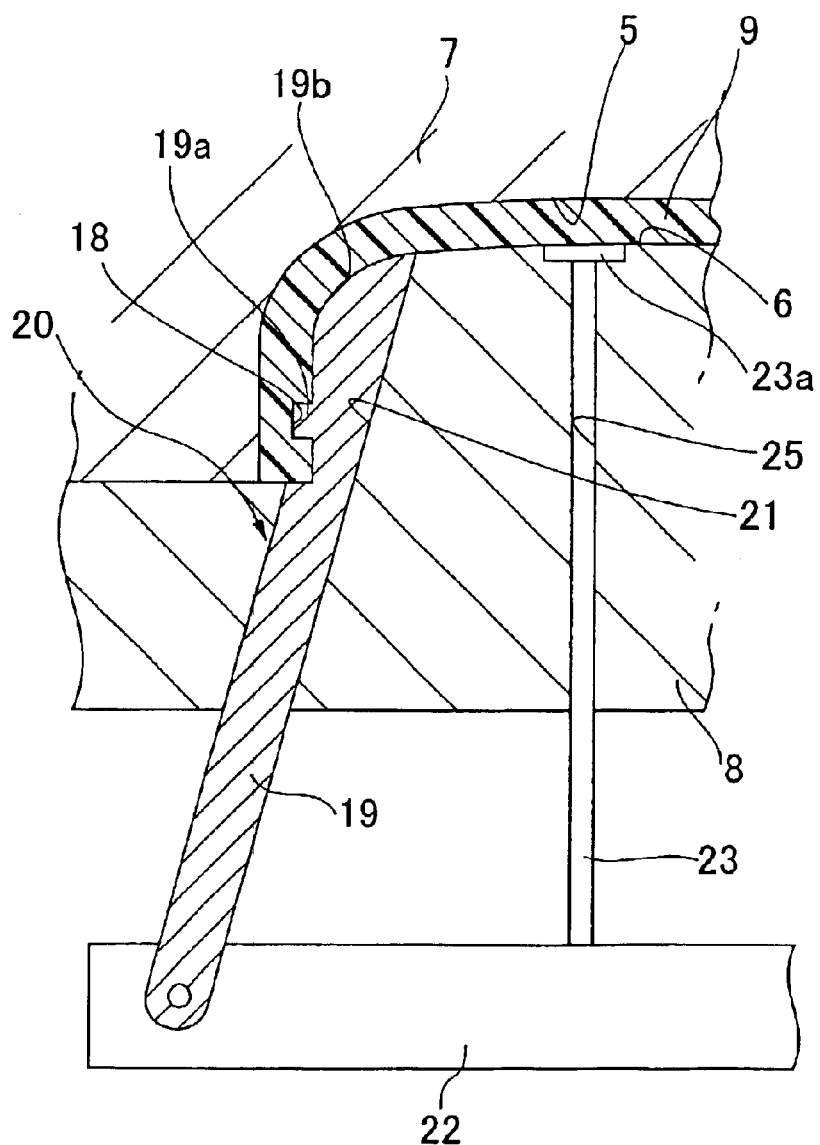
FIG. 10 is a cross-sectional view schematically showing a loose core.

Loose cores or similar molding cores are placed at those portions of the mold corresponding to undercut areas of the product. FIG. 10 is a cross-sectional view schematically showing one example of a loose core. A molding cavity 9 is formed between the concave portion 5 of the upper mold block 7 and the convex portion 6 of the lower mold block 8. Products obtained by the cooling and hardening of molten plastic that fills this molding cavity 9 may need to have an undercut 18. If left as is, this undercut 18 would hinder removal of the part from the mold after molding. The structure shown in FIG. 10 is one example of a loose core 20 adopted as a countermeasure thereto. The loose core 20 is provided with a long, thin rod-shaped core member 19, and on this core member 19 is formed a convex portion 19a corresponding to the undercut 18 along with the molding surface 19b in the vicinity.

Upon the lower mold block 8 is formed a guide surface 21 that inclines toward the interior above the position corresponding to the loose core 20. The back surface of the loose core 20 is placed along the guide surface 21 of the lower mold block 8.

Below the lower mold block 8 is placed a moveable plate 22 with gaps in the up and down direction with respect to this lower mold block 8 such that it is able to move in the up and down direction. The core member 19 has its lower edge linked to the moveable plate 22 by a pin linkage.

FIG. 10 shows the mold in the closed state. Molten plastic is injected into the molding cavity 9, cooled and hardened and then it is removed from the mold. In order to facilitate removal from the mold, an ejector pin 23 is attached to the moveable plate 22. At the time of removal from the mold, the upper mold block 7 is first moved upward. Next, when the moveable plate 22 is moved upward, the molded article is pushed upward by the ejector pin 23 and separated from the molding convex portion 6 of the lower mold block 8. At this time, the core member 19 of the loose core 20 also moves upward together with the molded article. The core member 19 moves along the guide surface 21 of the lower mold block 8, so its convex portion 19a and molding surface 19b separate from the molded article and move inward, and thus the molded article is removed completely from the mold.

The design of the core member 19 of the loose core 20 is also achieved by specifying the appropriate one from among a plurality of standard units of different sizes and types prepared in advance as the core member elements, and then forming the convex portion 19a and molding surface 19b of the stipulated shape. The design data for the convex portion 19a and molding surface 19b can be prepared based on the data for the product shape shown in FIG. 1.

Once the size and type of the core member 19 of the loose core 20 are determined, and its position is specified, the stipulated shape of the guide surface 21 is entered upon the lower mold block 8 in the screen display and stored as digital design data. In FIG. 8, the symbol 24 indicates positions where loose cores 20 are placed.

Placement of Ejector Pins

The ejector pins indicated by the symbol 23 in FIG. 10 must be placed at a plurality of places on the molded article. The ejector pins 23 are preferably placed at positions that have high rigidity in consideration of the shape of the molded article. For example, in the case of a molded article having the shape shown in FIG. 1, ejector pins 23 are placed at the four locations indicated by the symbol 23 in FIG. 1. As shown in FIG. 10, the ejector pins 23 have flanges 23a in the portions in contact with the molded article. Once the positions of the ejector pins 23 are determined, their length and the diameter of the flanges 23a are determined automatically from the shape of the molded article. At the same time, holes 25 corresponding to the ejector pins 23 are formed in the lower mold block 8 and the data therefor is stored as design data.

Preparation of Numerical Control Data

Figure 11:
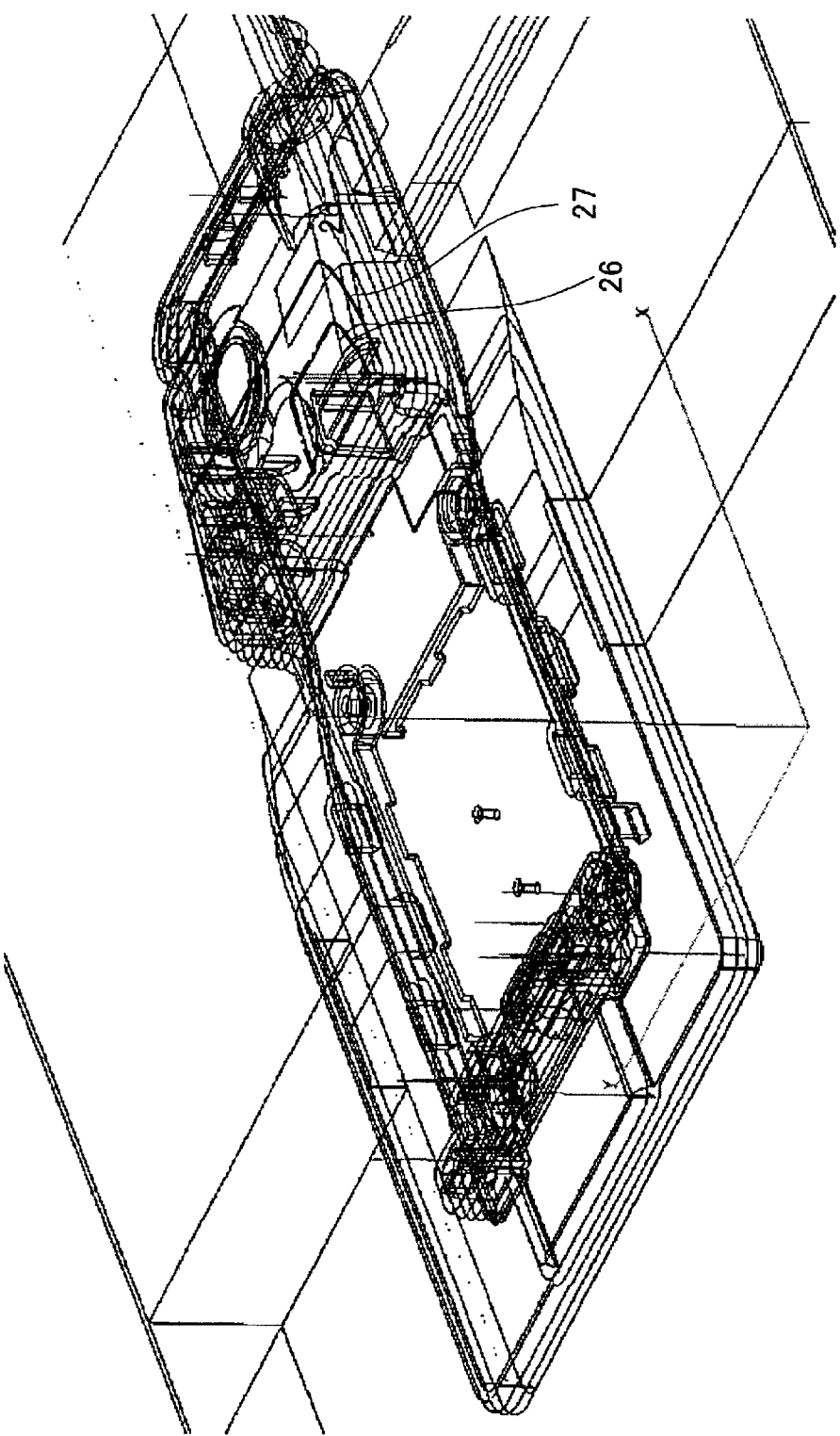
FIG. 11 is a perspective view used to describe the process of preparing numerical control data.
Figure 12:
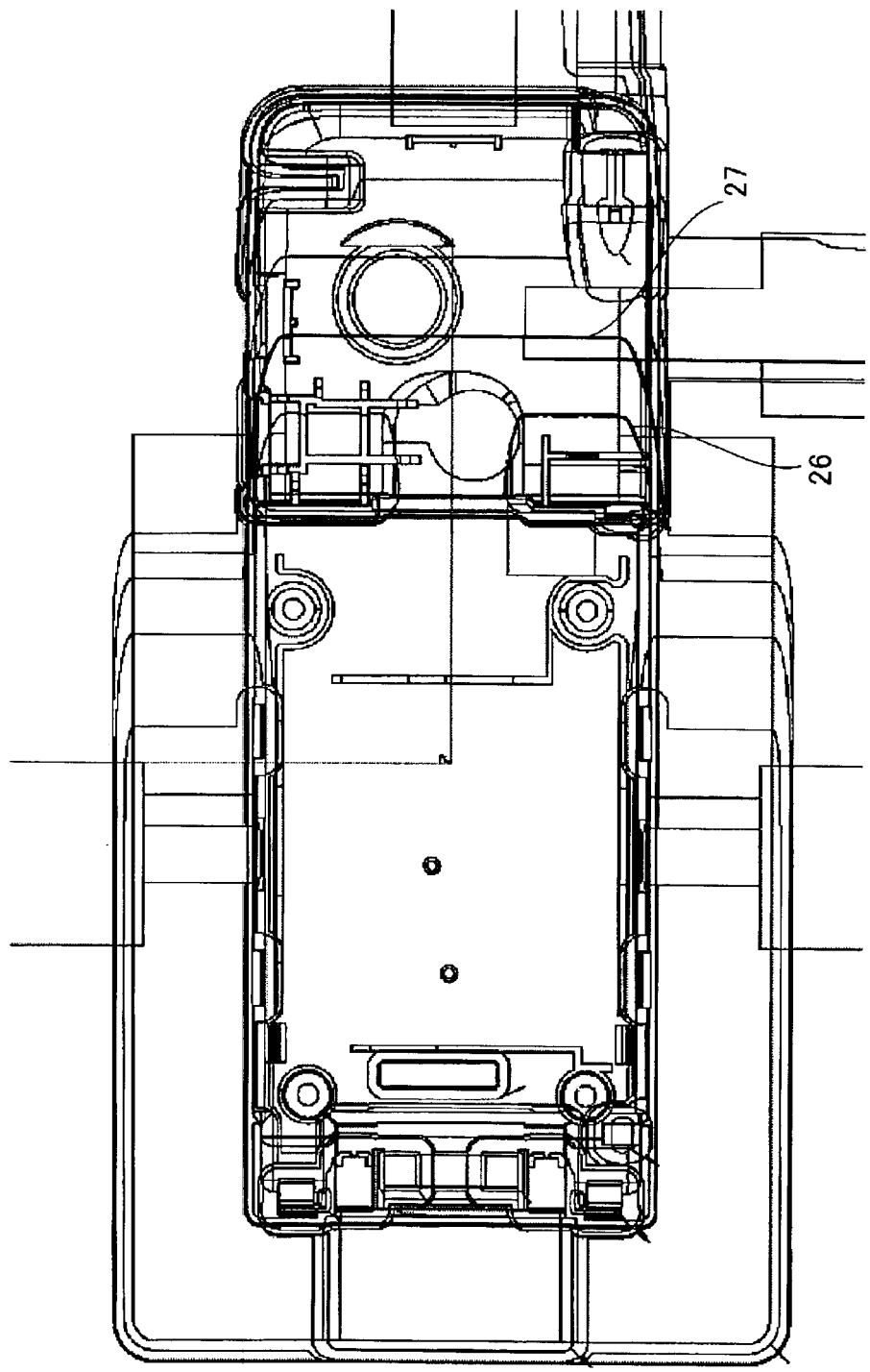
FIG. 12 is a top view of the mold block shown in FIG. 11.

When the design of the upper mold block 7 and lower mold block 8 of the mold and the design of the insert cores including slide cores and loose cores is complete, it is necessary to prepare numerical control data in order to perform cutting and machining based on this design data. FIG. 11 and FIG. 12 are schematic drawings showing one example of the preparation of numerical control data used to cut the upper mold block of a mold used to form a product different from the front cover for a mobile phone shown in FIG. 1. In this figure, the fine lines are contour lines that indicate points of the same elevation. First, the surface of the mold block is cut down to the height of the two contour lines 26 equivalent to the highest portion indicated by dashed-dotted lines. This cutting is performed by appropriately setting the reciprocating passes of the cutting tool. Next, cutting is performed so that the surface is smoothly contiguous to the position of the contour lines 27 adjacent to the contour lines 26, and thus the passes of the cutting tool are controlled so that cutting is performed by sequentially shifting to the adjacent contour lines. The numerical control data is prepared in order to determine such passes of the cutting tool and is stored in the form of digital data.

Cutting and Machining

Once the numerical control data for cutting and machining is prepared, this numerical control data is sent to a numerical control cutting machine, and the cutting and machining of the mold blocks and material is performed based on this data.

Control of Steps

Figure 13:
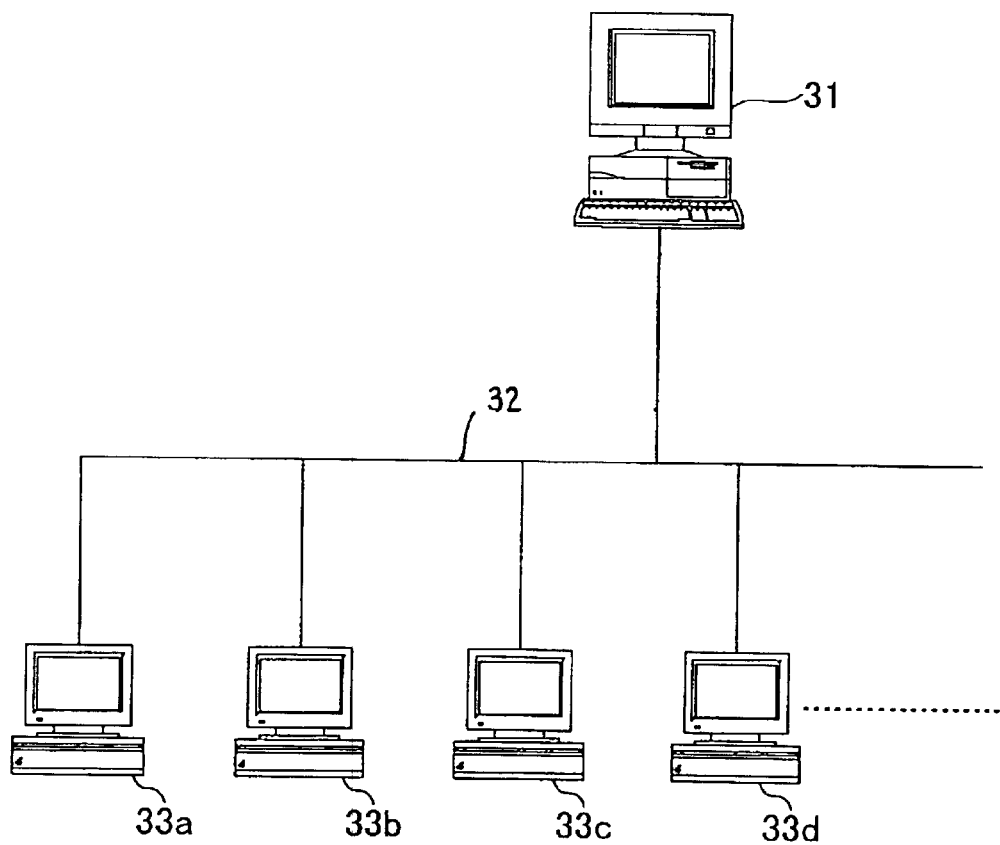
FIG. 13 is a system diagram showing an example of a computer system used to control the design and fabrication of molds.

In addition to the aforementioned mold design and fabrication steps, all of the steps from the ordering of molds to the completion of fabrication are controlled by the computer system. FIG. 13 shows one example of a computer system. Referring to FIG. 13, the computer system consists of a central processing computer 31 and a plurality of terminal units, namely terminal computers 33a, 33b, 33c, 33d, . . . , connected to this central processing computer 31 via a communications network 32.

Figure 14:
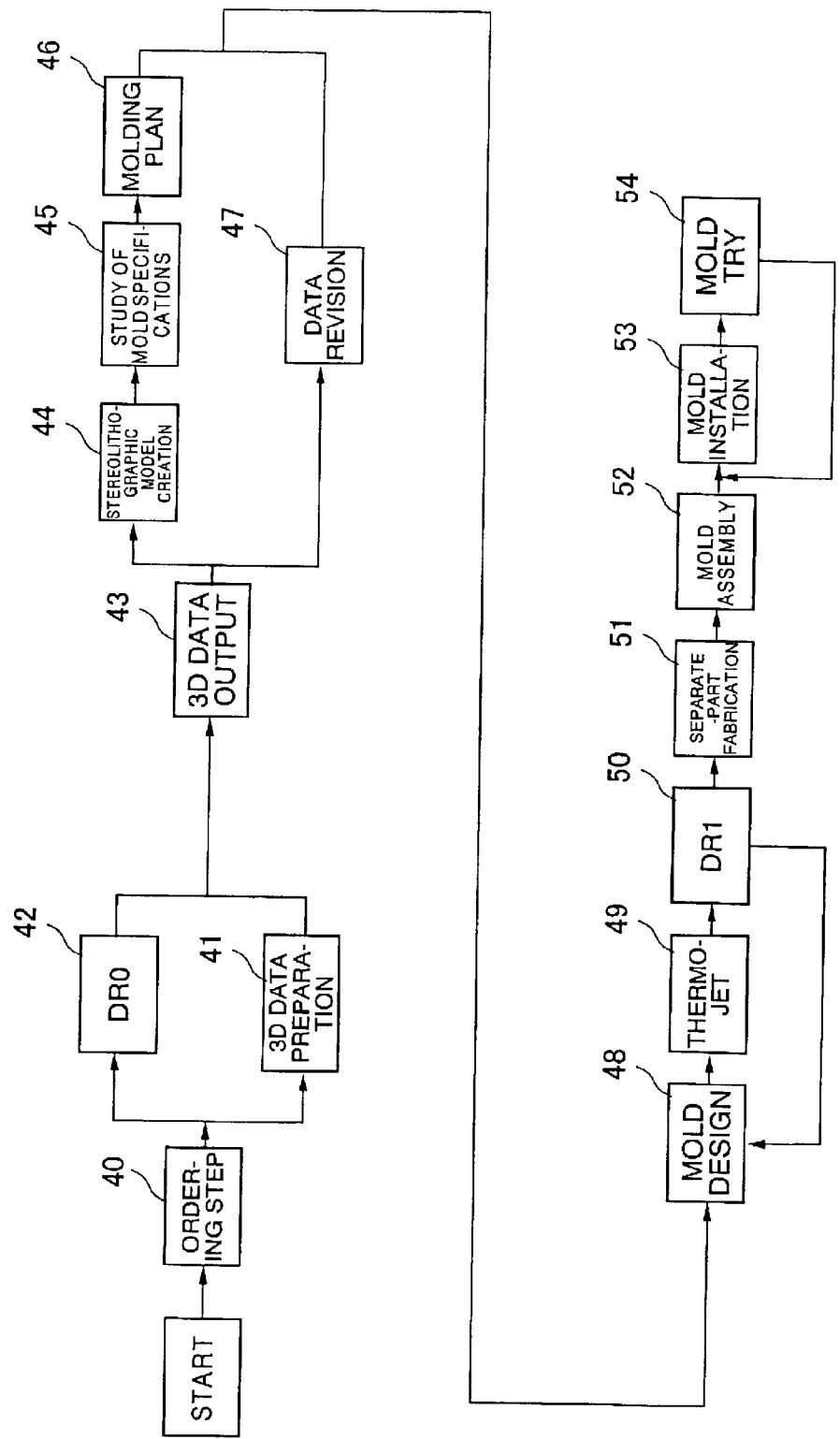
FIG. 14 is a system diagram showing the entire process of design and fabrication of molds to which the present invention is applied.

FIG. 14 is a work flowchart showing the main steps from ordering to completion of fabrication. In the ordering step 40, a customer orders the fabrication of a mold used to manufacture a specific product. The order is recorded in a database of the central processing computer 31 after adding an order number and other numbers used for control. As shown in step 41, for the ordered mold, product design data is prepared by three-dimensional CAD in the form of digital data. The digital data for product design is typically supplied by the customer. As shown in step 42, in parallel with the three-dimensional data preparation step 41 a design review is performed. This is used to check to make sure there is no problem with the product design itself with respect to mold fabrication. The three-dimensional product design data obtained in step 41 is sent to the central processing computer 31 of the computer system and stored in a database.

Step 43 is the step of reading out three-dimensional data, where the product design data obtained in step 41 and stored in the central processing computer 31 is read out by the terminal computer 33a and displayed upon its display screen. In step 44, ultraviolet curing resin is exposed based on this read out product design data to create a stereolithographic model of the product. As described previously, in the case that the product consists of two parts, for example, the front and back as in the covers of a mobile phone and these are fitted to each other to make an assembly, this is the step of confirming that there is no problem with fit when using the design data as is. After a stereolithographic model is created, based on these results, a study of the mold specifications is performed in step 45, and a molding plan is formulated in step 46. These steps 44, 45 and 46 are performed in parallel and the data may be revised in step 47 if necessary. The revised data is sent to the central processing computer 31 and stored in its database. At the end of each step, the operator clicks an "End" button or "Send" button on the display screen of the terminal computer to send a work completion signal to the central processing computer 31 and the completion of each step is recorded in the central processing computer 31.

The central processing computer 31 receives the work completion signals from the terminal computers assigned to the various steps, prepares a work notice table indicating the work to be performed next and arranges so that the terminal computers 33 can call up the work notice table. FIG. 15 shows one example of a work notice table. The person assigned a task can use a cursor to select the work item assigned to him from the work notice table and clicks to have the data required for that task called up to the terminal computer 33.

In FIG. 14, on orders for which mold design is complete, the ThermoJet step 49 is performed. The ThermoJet process is one type of stereolithographic process, where a stereolithographic model of the mold is created based on the data of the completed mold design to confirm the appropriateness of the design. Thereafter, the second design review is performed in step 50. Next, in the separate-part fabrication step indicated by step 51, the work of fabricating all of the parts required for the mold is performed. Thereafter, in the mold assembly step 52, mold assembly is performed, where the various appurtenant parts are assembled with the upper mold block and lower mold block, respectively. Finally, in the mold installation step 53, the mold is installed in an injection molding machine and a test injection molding is performed in the mold try step 54.

Mold Design

Figure 16A:
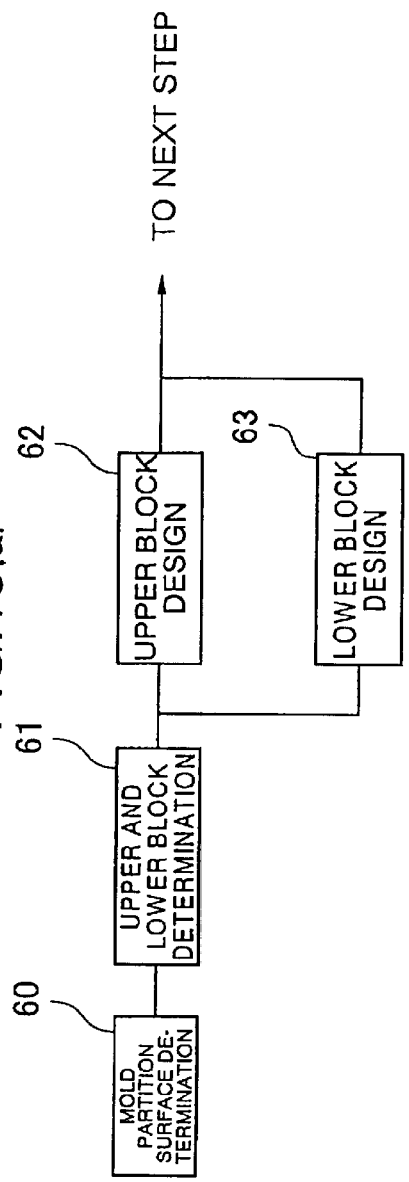
FIGS. 16(a)–16(c) show the mold design steps in Preferred Embodiment 1 of the present invention, where

The mold design step 48 consists of a plurality of further subdivided steps. An example thereof is shown in FIG. 16. In FIG. 16(a), in the first stage of mold design, as described previously, the mold partition surface determination step 60 is performed (see FIG. 1 and FIG. 2). Once the mold partition surface is determined, in the upper and lower block determination step 61, as shown in FIG. 3 and FIG. 4, the upper and lower mold blocks 7 and 8 are determined. Thereafter, as shown in steps 62 and 63, the design of the upper mold block 7 and lower mold block 8 is started, respectively.

Figure 16B:
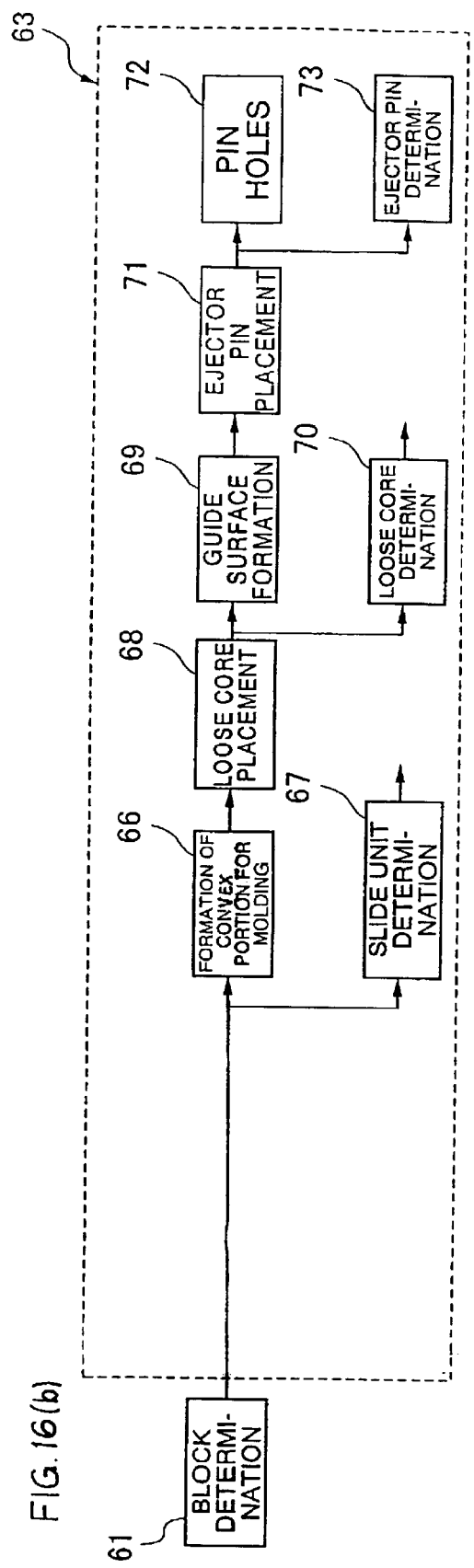

As shown in FIG. 16(b), in the design of the lower block, after step 61, step 66 of determining the molding convex portion 6 is performed automatically and in parallel, in step 67, the slide unit 12 is determined. Similarly, in step 68, the placement of the loose core 20 is determined and in step 69, the guide surface 21 for the core member 19 in the lower mold block 8 is formed. In parallel, the shape of the core member 19 of the loose core 20 is determined (step 70). These steps are all performed based on the product design data. Thereafter, in step 71, the placement of the ejector pins 23 is determined. Then, the holes 25 in the lower mold block 8 that the ejector pins 23 pass through are formed (step 72). In parallel, the length of the ejector pin 23 and the diameter of the flange are determined (step 73).

Figure 16C:
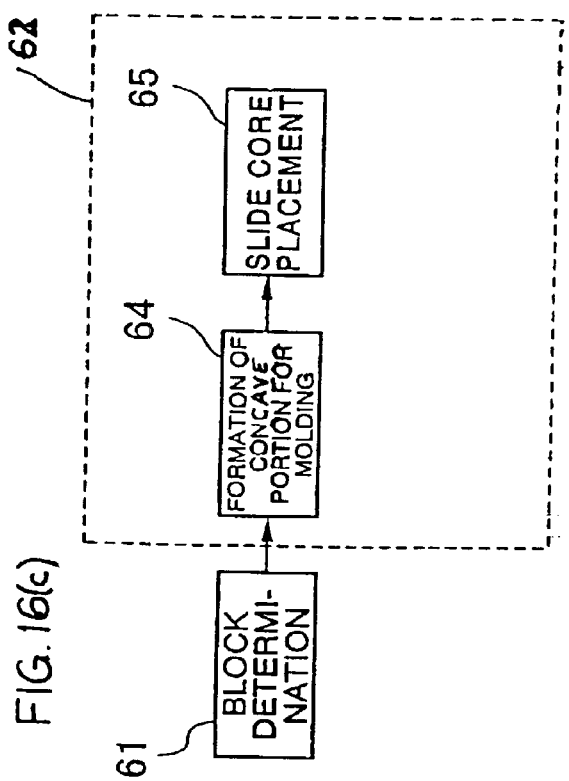

FIG. 16(c) discloses the design of the upper block 7 which includes step 64 of determining formation of the molding concave portion 5 and, in step 65, the placement of the slide core 11a.

In mold design also, at the end of each step, the operator clicks a "Send" button or "End" button on the display screen of the terminal computer 33 to send a work completion signal indicating the end of each work step to the central processing computer 31. In response to this work completion signal, the central processing computer 31 prepares a work notice table indicating the work in mold design that can be performed next. This work notice table can be called up by the terminal computers 33 and displayed on their display screens. FIG. 15 shows the case of order number 0011. Under this order number, the work notice table indicates that the slide core placement work indicated by step 65 can be performed as the next task. Accordingly, the person assigned to this work can call up the work notice table on his terminal computer 33 and click on the location corresponding to this work, and then perform step 65 for the slide core placement.

Separate-Part Fabrication Step

Figure 17:
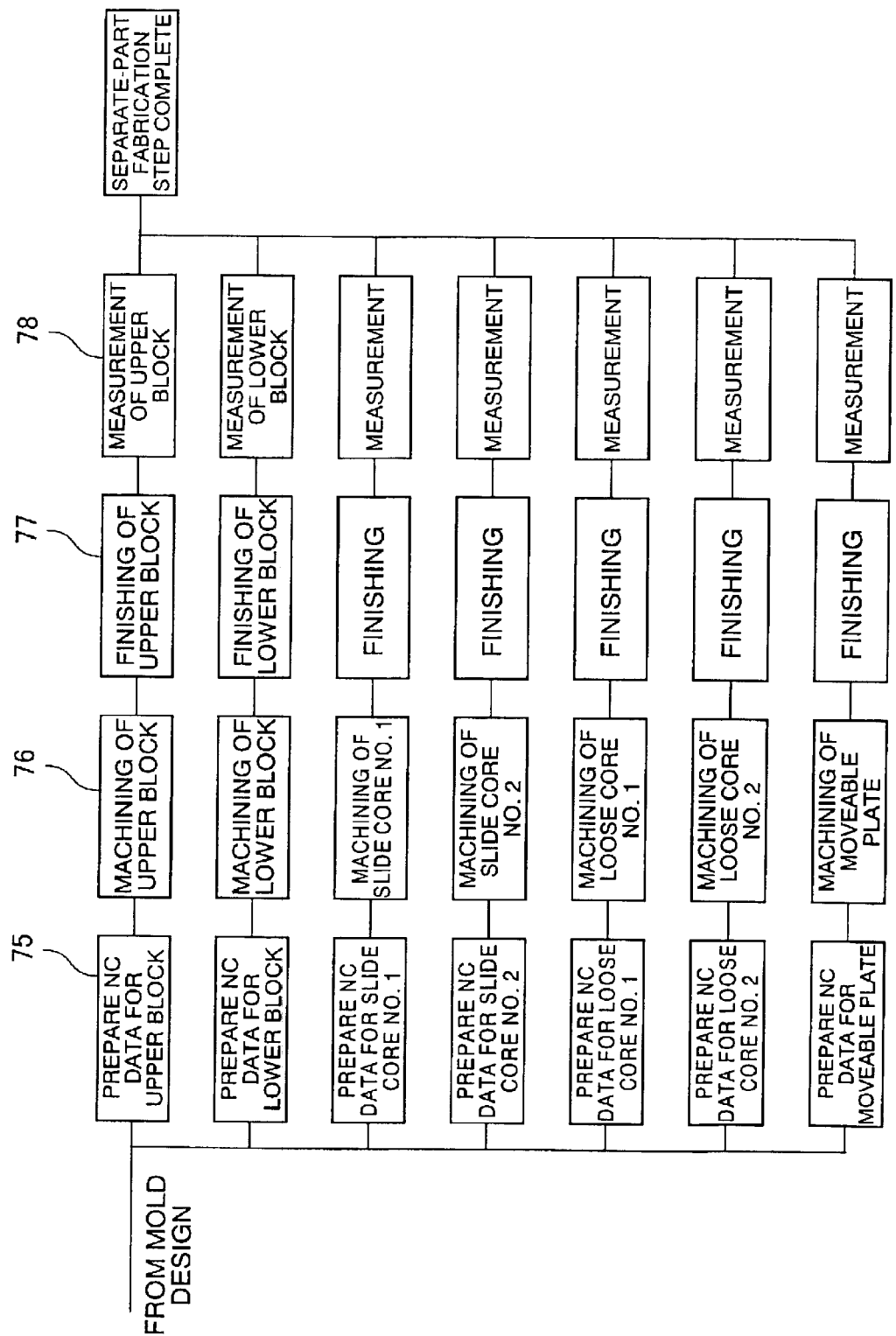
FIG. 17 is a system diagram showing the work flow for various parts in mold fabrication.

When the mold design step 48 is complete, the separate-part fabrication step 51 is performed. Here, the central processing computer 31 receives information from the previously-performed mold design step 48, determines the number of parts required for mold fabrication and prepares a number of work flow-lines corresponding to the number of parts. FIG. 17 shows one example thereof. In FIG. 17, the central processing computer 31 prepares work notice tables for the terminal computers 33 assigned to the preparation of numerical control data in order to prepare numerical control data for the various parts consisting of the front cover 1, lower mold block 8, slide core No. 1, slide core No. 2, loose core No. 1, loose core No. 2 and the moveable plate. FIG. 18 is an example of such a work notice table for the one of the terminal computers 33 assigned to the preparation of numerical control data. These work notice tables can be called up on the one of the terminal computers 33 assigned to the preparation of numerical control data, and the operator can call up any of the various work notice tables on his terminal computer 33 and click to start on the work.

In this preferred embodiment of the present invention, within the system, it is possible to automatically prepare lines on which the information required for each of a plurality of parts flows, so there is no need to prepare in advance a large number of work lines anticipating a large number of parts. Moreover, these work lines are automatically deleted when the work steps are complete Referring to FIG. 17, regarding the upper mold block 7, in step 75 the numerical control (NC) data for the cutting and machining of this upper mold block 7 is prepared. When the preparation of numerical control data is complete, the work completion signal is sent from the terminal computer 33 to the central processing computer 31, and the central processing computer 31 prepares a cutting and machining work notice table that indicates that cutting and machining work is possible. Similarly, regarding the lower mold block 8, slide core No. 1, slide core No. 2, loose core No. 1, loose core No. 2 and moveable plate, the numerical control data for the cutting and machining is prepared. When the preparation of numerical control data is complete, the work completion signal is sent from the terminal computer 33 to the central processing computer 31, and the central processing computer 31 prepares a cutting and machining work notice table that indicates that cutting and machining work is possible. FIG. 19 shows an example of a work notice table for a terminal computer 33 assigned to machining work.

The operator assigned to mold machining operates his terminal computer 33 to call up the work notice table and performs the machining and finishing of the upper mold block 7 using a numerical control machine based on the numerical control data prepared in step 75. This work is indicated in FIG. 17 as steps 76 and 77, respectively. Thereafter, the upper mold block 7 thus fabricated is measured in step 78 and the upper mold block fabrication work is all complete. When the upper mold block fabrication work is complete, a work completion signal is sent from the assigned terminal computer 33 to the central processing computer 31. Work on parts other than the upper mold block 7 can also be performed in parallel, so each time the work of preparing numerical control data, or machining, finishing and measuring parts is completed, a work complete signal is sent from the respective assigned terminal computer 33 to the central processing computer 31.

When the central processing computer 31 has received a measurement completion signal for all of the parts, it determines that the separate-part machining steps are all complete and prepares work notice tables for the mold assembly step 52 which is the next step. At this time, the work flow-lines for all of the parts are deleted. The work notice tables can be called up on the terminal computers 33 assigned to the mold assembly step 52, and the operator assigned to mold assembly can call up the work notice table on his terminal computer 33 and start the work of mold assembly. When the mold assembly step 52 is complete, a work completion signal is sent from the assigned terminal computer 33 to the central processing computer 31.

Similarly, the mold installation step 53 and mold try step 54 are performed, thereby completing all of the mold fabrication work.

Here follows a description of the manufacturing process control system as Preferred Embodiment 2 of the present invention, with reference to FIG. 20 through FIG. 35.

Figure 20:
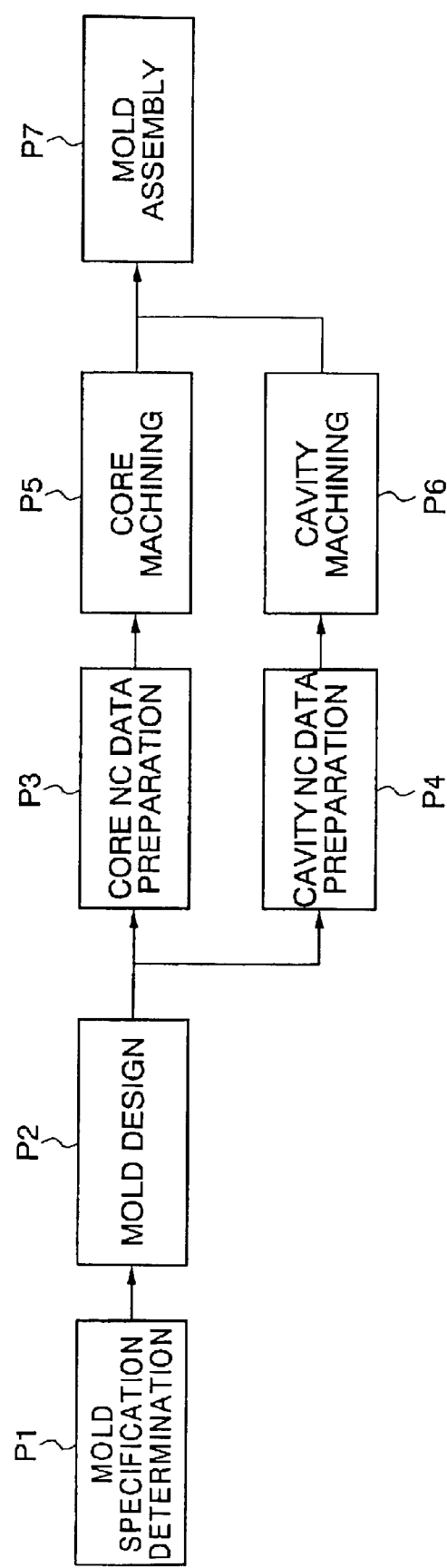
FIG. 20 is a block diagram showing the mold manufacturing process of Preferred Embodiment 2 of the present invention.

We shall first describe the manufacturing process that is controlled using the manufacturing process control system according to this preferred embodiment. As shown in FIG. 20, the manufacturing process that is controlled using the manufacturing process control system according to this preferred embodiment is a mold fabrication process used in the molding of the covers of mobile phones and the like. This manufacturing process is divided into seven steps: the mold specification determination step P1 in which the mold specifications are prepared, the mold design step P2 in which the shape data for the core and cavity is prepared, the core NC data preparation step P3 in which numerical control data for machining cores (core NC data) is prepared, the cavity NC data preparation step P4 in which numerical control data for machining the cavity (cavity NC data) is prepared, the core machining step P5 in which the cores are machined, the cavity machining step P6 in which the cavity is machined and the mold assembly step P7 in which the cores and cavity are assembled to complete the mold.

As shown in FIG. 20, this manufacturing process must be executed in the order P1, P2, P3, P5, P7 and P1, P2, P4, P6, P7. Steps P3 and P5, and steps P4 and P6 can be processed in parallel (overlapping temporally).

Here follows a description of the constitution of the manufacturing process control system according to this preferred embodiment. FIG. 21 is a diagram schematically showing the constitution of the manufacturing process control system of this preferred embodiment. As shown in FIG. 21, the manufacturing process control system 200 of this preferred embodiment is provided with a manufacturing process control apparatus (central processing computer) 202 and the first through seventh user terminals 206, 208, 210, 212, 214, 216, 218 connected to this manufacturing process control apparatus 202 via a communications network 204. The communications network 204 may be a network based on leased lines or the Internet.

The manufacturing process control apparatus 202 is provided with a storage unit 220 that stores various types of data, a receiver 222 that receives signals or information from the user terminals, a transmitter 224 that transmits signals or information to the user terminals, a progress controller 226 that controls the progress of steps and a display 228.

The manufacturing process control apparatus 202 and the user terminals 206–218 each constitutes a computer system consisting of a CPU, memory, hard disk, keyboard, mouse, display and the like. Here follows a description of the detailed constitution of the various elements.

The first user terminal 206 is a device that executes or controls the mold specification determination step P1 (mold specification preparation). The first user terminal 206 is constituted such that it receives from the manufacturing process control apparatus 202 the mold drawings (electronic data) and the like, executes step P1 and transmits to the manufacturing process control apparatus 202 signals to the effect that step P1 is complete along with the mold specifications (electronic data) thus prepared.

The second user terminal 208 is a device that executes or controls the mold design step P2 (core and cavity shape data preparation, or namely CORE and CAVI shape data preparation). The second user terminal 208 is constituted such that it receives from the manufacturing process control apparatus 202 the mold specifications and the like prepared in the previous step, executes step P2 and transmits to the manufacturing process control apparatus 202 signals to the effect that step P2 is complete along with the core shape data and cavity shape data thus generated.

The third user terminal 210 is a device that executes or controls the core (CORE) NC data preparation step P3 (core NC data generation). The third user terminal 210 is constituted such that it receives from the manufacturing process control apparatus 202 the core shape data prepared in the previous step, executes step P3 and transmits to the manufacturing process control apparatus 202 signals to the effect that step P3 is complete along with the core NC data thus generated.

The fourth user terminal 212 is a device that executes or controls the cavity (CAVI) NC data preparation step P4 (cavity NC data generation). The fourth user terminal 212 is constituted such that it receives from the manufacturing process control apparatus 202 the cavity shape data prepared in the previous step, executes step P4 and transmits to the manufacturing process control apparatus 202 signals to the effect that step P4 is complete along with the cavity NC data thus generated.

The fifth user terminal 214 is a device that controls the core (CORE) machining step P5 (core machining), connected to a machining center 230 that performs core machining. The fifth user terminal 214 is constituted such that it receives from the manufacturing process control apparatus 202 the core NC data generated in the previous step P3, transmits this core NC data to the machining center 230 and causes the machining center 230 to perform core machining. Then it transmits to the manufacturing process control apparatus 202 signals to the effect that step P5 is complete along with the core machined article number (CORE machined article No.) attached to the machined core (core machined article).

The input of the core machined article number may be performed using a keyboard or other input device, or it may be performed by applying bar codes to the core machined articles (or parts prior to machining) and using a bar code reader provided on the fifth user terminal 214 or machining center 230 to read these bar codes. By using a bar code reader and bar codes, the actual object (core machined article) and information (core machined article number) can be easily associated. The fifth user terminal 214 may also be made as a single unit with the machining center 230.

The sixth user terminal 216 is a device that controls the cavity (CAVI) machining step P6 (cavity machining), connected to a machining center 232 that performs cavity machining. The sixth user terminal 216 is constituted such that it receives from the manufacturing process control apparatus 202 the cavity NC data generated in the previous step P4, transmits this cavity NC data to the machining center 232 and causes the machining center 232 to perform cavity machining. Then it transmits, to the manufacturing process control apparatus 202, signals to the effect that step P6 is complete along with the cavity machined article number (CAVI machined article No.) attached to the machined cavity (cavity machined article).

The input of the cavity machined article number may be performed using a keyboard or other input device, or it may be performed by applying bar codes to the cavity machined articles (or parts prior to machining) and using a bar code reader provided on the sixth user terminal 216 or machining center 232 to read these bar codes. By using a bar code reader and bar codes, the actual object (cavity machined article) and information (cavity machined article number) can be easily associated. The sixth user terminal 216 may also be made as a single unit with the machining center 232.

The seventh user terminal 218 is user terminal that controls the mold assembly step P7. The seventh user terminal 218 is constituted such that it receives from the manufacturing process control apparatus 202 the core and cavity machined article number generated in the previous steps P5 and P6, and the operator can refer to these machined article numbers and execute the mold assembly of core and cavity (P7). Then it transmits to the manufacturing process control apparatus 202 the product number (product No.) attached to the assembled product (mold).

Note that the input of this product number may be performed by applying bar codes to the assembled product (mold) and using a bar code reader provided on the seventh user terminal 218 to read these bar codes. By using a bar code reader and bar codes, the actual object (product assembled from the core and cavity) and information (product number) can be easily associated.

The storage unit 220 of the manufacturing process control apparatus 202 has a step information table 220a, step control table 220b, data storage region 220c and data control table 220d.

The step information table 220a stores the work content of each of the aforementioned seven steps P1 through P7, respectively, along with information required to execute that work content.

Specifically, as shown in FIG. 22, the work content of the mold specification determination step P1 is the preparation of mold specifications, and the information required to execute this work is the drawings, so they are associated with each other and stored as items related to the mold specification determination step P1 in the step information table 220a. In addition, the work content of the mold design step P2 is the preparation of core shape data and the preparation of cavity shape data, and the information required to execute this work is the mold specifications, so they are associated with each other and stored as items related to the mold design step P2. In addition, the work content of the core NC data preparation step P3 is the preparation of core NC data, and the information required to execute this work is the core shape data, so they are associated with each other and stored as items related to the core NC data preparation step P3. In addition, the work content of the cavity NC data preparation step P4 is the preparation of cavity NC data, and the information required to execute this work is the cavity shape data, so they are associated with each other and stored as items related to the cavity NC data preparation step P4.

In addition, the work content of the core machining step P5 is the core machining, and the information required to execute this work is the core NC data, so they are associated with each other and stored as items related to the core machining step P5. In addition, the work content of the cavity machining step P6 is the cavity machining, and the information required to execute this work is the cavity NC data, so they are associated with each other and stored as items related to the cavity machining step P6. Furthermore, the work content of the mold assembly step P7 is the mold assembly of core and cavity, and the information required to execute this work is the core machined article number and cavity machined article number, so they are associated with each other and stored as items related to the mold assembly step P7.

The step control table 220b is a table used to control which of the respective molds machined in this manufacturing process have proceeded to which step, organized by order number (order No.).

The example of the step control table 220b shown in FIG. 23 indicates that the manufacturing processes for the six products (molds) with order numbers 1–6 are controlled by the manufacturing process control apparatus 202, further showing which work step has been completed on each of the molds. Specifically, this step control table 220b currently stores information indicating that the product with order number 1 has completed the steps up to the cavity machining step P6, the product with order number 2 has completed the steps up to the cavity NC data preparation step P4, the product with order number 3 has completed the steps up to the core NC data preparation step P3, the product with order number 4 has completed the steps up to the mold design step P2, while the product with order number 5 has completed only the mold specification determination step P1, and the product with order number 6 has not completed any steps.

The data storage region 220c is a region where the information (data) required to execute the aforementioned work steps is stored by product (order number). To wit, the data storage region 220c stores the product drawings which are information required to perform the mold specification determination step P1, the mold specifications which are generated in the mold specification determination step P1 and are the information (data) required to execute the mold design step P2, the core shape data and cavity shape data which are generated in the mold design step P2 and are the information required to execute the core NC data preparation step P3 and cavity NC data preparation step P4, the core NC data which are generated in the core NC data preparation step P3 and are the information (data) required to perform the core machining step P5, and the cavity NC data which are generated in the cavity NC data preparation step P4 and are the information (data) required to perform the cavity machining step P6.

In the example shown in FIG. 24, the data storage region 220c stores the drawings of product numbers 1–6, the mold specifications of the products with order numbers 1–5, the core shape data and cavity shape data of the products with order numbers 1–4, the core NC data of the products with order numbers 1–3 and the cavity NC data of the products with order numbers 1–2.

The data control table 220d is a table that indicates where the information (data) required to execute the various steps is stored in the data storage region 220c. In the example shown in FIG. 25, the data control table 220d stores the location (file name) in the data storage region 220c of the drawings for each of the products (molds) with order numbers 1–6, the location (file name) in the data storage region 220c of the mold specifications for each of the products (molds) with order numbers 1–5, the location (file name) in the data storage region 220c of the core shape data for each of the products (molds) with order numbers 1–4, the location (file name) in the data storage region 220c of the cavity shape data for each of the products (molds) with order numbers 1–4, the location (file name) in the data storage region 220c of the core NC data for each of the products (molds) with order numbers 1–3, the location (file name) in the data storage region 220c of the cavity NC data for each of the products (molds) with order numbers 1–3, and the location (file name) in the data storage region 220c of the core NC data for the product (mold) with order number 1. In addition, in this preferred embodiment, the data control table 220d stores the core machined article number and cavity machine article number of the product with the order number 1. Moreover, if a product number generated by the mold assembly step P7 is present, this product number is also stored.

The receiver 222 is constituted so that when the aforementioned steps are completed, a signal to the effect that the step is complete and the information generated in that step are received from the user terminal that executed that step. Moreover, the signals to the effect that the step is complete is stored in the step control table 220b and elsewhere as information to the effect that the step is complete, and the address thereof is stored in the data control table 220d.

The transmitter 224 is constituted such that when information required for the execution of the next step is generated or input, it transmits to the user terminal that is to execute the next step a signal to the effect that the step is to be started and the information required for that step.

To wit, when the receiver 222 receives information to the effect that a certain step is complete, or when some new information is stored in the storage unit 220, or other events occur, the transmitter 224 performs a lookup in the required information column of the step information table 220a, and checks for information required to perform a certain step. Next, the transmitter 224 performs a lookup of the data control table 220d and checks to see if that required information is stored in the data storage region 220c. If the required information is already stored in the data storage region 220c, then the transmitter 224 determines that all the information required to perform that step is present, and sends to the user terminal controlling that step a signal to the effect that the step can be started (or to the effect that the step is to be started) together with the information required to perform that step.

For example, if the drawings which are the information required to perform the mold specification determination step P1 are stored in the data storage region 220c, the transmitter 224 transmits to the first user terminal 206, which executes the mold specification determination step P1, a signal to the effect that the mold specification determination step P1 can be started (or to the effect that it is to be started) together with the drawings which are the information required to perform the work contained in the mold specification determination step P1.

In addition, the transmitter 224 is constituted such that, when a signal to the effect that the mold specification determination step P1 is complete and the mold specifications which are the information generated by the mold specification determination step P1 are received by the receiver 222 and these mold specifications are stored in the data storage region 220c, a signal to the effect that the mold design step P2 can be started (or is to be started) is transmitted to the second user terminal 208, which executes the mold design step P2, along with the mold specifications which is the information required to perform the mold design step P2.

In addition, the transmitter 224 is constituted such that, when a signal to the effect that the mold design step P2 is complete and the core shape data which is the information generated by the mold design step P2 are received by the receiver 222 and these mold specifications are stored in the data storage region 220c, a signal to the effect that the mold design step P2 can be started (or is to be started) is transmitted to the second user terminal 208, which executes the mold design step P2, along with the mold specifications which is the information required to perform the mold design step P2.

In addition, the transmitter 224 is constituted such that, when a signal to the effect that the mold design step P2 is complete and the core shape data which is the information generated by the mold design step P2 are received by the receiver 222 and this core shape data is stored in the data storage region 220c, a signal to the effect that the core NC data preparation step P3 can be started (or is to be started) is transmitted to the fourth user terminal 212, which executes the core NC data preparation step P3, along with the core shape data which is the information required to perform the core NC data preparation step P3.

In addition, the transmitter 224 is constituted such that, when a signal to the effect that the mold design step P2 is complete and the cavity shape data which is the information generated by the mold design step P2 are received by the receiver 222 and this cavity shape data is stored in the data storage region 220c, a signal to the effect that the cavity NC data preparation step P4 can be started (or is to be started) is transmitted to the fourth user terminal 212, which executes the cavity NC data preparation step P4, along with the cavity shape data which is the information required to perform the cavity NC data preparation step P4.

In addition, the transmitter 224 is constituted such that, when a signal to the effect that the core NC data preparation step P3 is complete and the core NC data which is the information generated by the core NC data preparation step P3 are received by the receiver 222 and this core NC data is stored in the data storage region 220c, a signal to the effect that the core machining step P5 can be started (or is to be started) is transmitted to the fifth user terminal 214, which controls the core machining step P5, along with the core NC data which is the information required to perform the core machining step P5.

In addition, the transmitter 224 is constituted such that, when a signal to the effect that the cavity NC data preparation step P4 is complete and the cavity NC data which is the information generated by the cavity NC data preparation step P4 are received by the receiver 222 and this cavity NC data is stored in the data storage region 220c, a signal to the effect that the cavity machining step P6 can be started (or is to be started) is transmitted to the sixth user terminal 216, which controls the cavity machining step P6, along with the cavity NC data which is the information required to perform the cavity machining step P6.

In addition, the transmitter 224 is constituted such that, when a signal to the effect that the core machining step P5 and cavity machining step P6 are complete and the core machined article number and cavity machined article number which are the information generated by the core machining step P5 and cavity machining step P6 are received by the receiver 222 and this core machined article number and cavity machined article number are stored in the data storage region 220c, a signal to the effect that the mold assembly step P7 can be started (or is to be started) is transmitted to the seventh user terminal 218, which controls the mold assembly step P7, along with the core machined article number and cavity machined article number which are the information required to perform the mold assembly step P7.

The progress controller 226 is constituted such that, based on the information stored in the step control table 220b, it controls the progress of the mold manufacturing process for each of the plurality of products (molds) controlled by the manufacturing process control system 200, and displays the progress on the display 228. For example, as shown in FIG. 26, the current plans and results of execution of the seven steps described above are presented in chart form for the molds with order numbers 1–6 under control.

Referring to the "Results" rows in the chart of FIG. 26, one can see that as of the current date (June 14), the mold with order number 1 has completed the mold specification determination step P1, mold design step P2, core NC data preparation step P3, cavity NC data preparation step P4, core machining step P5 and cavity machining step P6 and is currently in the mold assembly step P7. In addition, one can see that the mold with order number 2 has completed the work contained in mold specification determination step P1, mold design step P2, core NC data preparation step P3 and cavity NC data preparation step P4, and it is currently in both the core machining step P5 and cavity machining step P6. One can similarly determine what step the molds with order numbers 3–6 are in.

In addition, referring to the "Plans" and "Results" rows of the chart of FIG. 26, one can see that, for example, the manufacturing process for the mold with order number 1 is proceeding according to plan, but the manufacturing process for the molds with order number 2 and order number 4 is proceeding ahead of schedule.

With the manufacturing process control system 200 of this preferred embodiment constituted as such, the various user terminals are constituted such that they can display the tasks controlled by each. For example, taking the state shown on the chart of FIG. 26 as an example, the various user terminals 206–218 can display the current tasks as of June 14 as follows.

FIG. 27 is an example of the unprocessed task list screen which displays a list of unprocessed tasks controlled by the first user terminal 206 which executes the mold specification determination step P1. From this screen, one can see that the first user terminal 206 is currently controlling the mold specification determination step P1 of the mold with order number 6 as an unprocessed task. Here, the operator of the first user terminal 206, or namely the operator in charge of the mold specification determination step P1 may select the "Determine mold specification" box for order number 6 which is an unprocessed task, and display a step information screen such as that shown in FIG. 28 on the display of the first user terminal 206.

This step information screen contains the name of the step (e.g., the mold specification determination step), order number (e.g., 6), the drawing which is the information required to perform this step and the location of that information (e.g., a:¥fig¥fig6.bmp), indication that the work of this step is the preparation of mold specifications and the location of the information generated in this step (e.g., a:¥spec¥spec6.txt). The operator of the first user terminal 206 refers to such a step information screen while performing the mold specification determination step P1 for order number 6.

FIG. 29 is an example of the unprocessed task list screen which displays a list of unprocessed tasks currently controlled by the second user terminal which controls or executes mold design step P2. This unprocessed task list screen is displayed on the display of the second user terminal 208. From this screen, one can see that the second user terminal 208 is currently controlling the mold design step P2 of order number 5 as an unprocessed task. Here, the operator of the second user terminal 208, namely the operator in charge of the mold design step P2, may select the "Design mold" box for the mold of order number 5 which is an unprocessed task, and display a step information screen on the display of the second user terminal 208.

This step information screen contains the name of the step, order number, the information required to perform this step and the location of that information, the work of this step and the location of the information generated in this step. The operator of the second user terminal 208 refers to such a step information screen while performing the mold design step P2 for the mold with order number 5.

FIG. 30 is an example of the unprocessed task list screen which displays a list of unprocessed tasks currently controlled by the third user terminal 210 which controls the core NC data preparation step P3. This unprocessed task list screen is displayed on the display of the third user terminal 2 10. From this screen, one can see that the third user terminal 210 is currently controlling the core NC data preparation step P3 of the mold of order number 4 as an unprocessed task. The operator of the third user terminal 210, namely the operator in charge of the core NC data preparation step P3, may select the "Prepare core NC data" box for the mold of order number 4 which is an unprocessed task, and display a step information screen on the display of the third user terminal 210. The step information screen contains the name of the step, order number, the information required to perform this step and the location of that information, the work contained in this step and the location of the information generated in this step. The operator of the third user terminal 210 refers to such a step information screen while performing the core NC data preparation step P3 for the mold with order number 4.

FIG. 31 is an example of the unprocessed task list screen which displays a list of unprocessed tasks currently controlled by the fourth user terminal 212 which controls the cavity NC data preparation step P4. This unprocessed task list screen is displayed on the display of the fourth user terminal 212. From this screen, one can see that the fourth user terminal 212 is currently controlling the cavity NC data preparation step P4 of the molds of order numbers 3 and 4 as unprocessed tasks. Here, the operator of the fourth user terminal 212, namely the operator in charge of the cavity NC data preparation step P4, may select the "Prepare cavity NC data" box for the mold of order number 3 or 4 which are unprocessed tasks, and display a step information screen on the display of the fourth user terminal 212. This step information screen contains the name of the step, order number, the information required to perform this step and the location of that information, the work contained in this step and the location of the information generated in this step. The operator of the fourth user terminal 212 refers to such a step information screen while performing the cavity NC data preparation step P4 sequentially for the molds with order numbers 3 and 4.

FIG. 32 is an example of the unprocessed task list screen which displays a list of unprocessed tasks currently controlled by the fifth user terminal 214 which controls the core machining step P5. This unprocessed task list screen is displayed on the display of the fifth user terminal 214. From this screen, one can see that the fifth user terminal 214 is currently controlling the core machining step P5 of the molds of order numbers 2 and 3 as unprocessed tasks. The operator of the fifth user terminal 214, namely the operator in charge of the core machining step P5, may select the "Machine core" box for order number 2 or 3 which are unprocessed tasks, and display a step information screen on the display of the fifth user terminal 214. This step information screen contains the name of the step, order number, the information required to perform this step and the location of that information, the work contained in this step and the location of the information generated in this step. The operator of the fifth user terminal 214 refers to such a step information screen while performing the cavity core machining step P5 sequentially for the molds with order numbers 2 and 3.

FIG. 33 is an example of the unprocessed task list screen which displays a list of unprocessed tasks currently controlled by the sixth user terminal 216 which controls the cavity machining step P6. This unprocessed task list screen is displayed on the display of the sixth user terminal 216. From this screen, one can see that the sixth user terminal 216 is currently controlling the cavity machining step P6 of the mold of order number 2 as an unprocessed task. The operator of the sixth user terminal 216, namely the operator in charge of the cavity machining step P6, may select the "Machine cavity" box for order number 2 which is an unprocessed task, and display a step information screen on the display of the sixth user terminal 216. The step information screen contains the name of the step, order number, the information required to perform this step and the location of that information, the work contained in this step and the location of the information generated in this step. The operator of the sixth user terminal 216 refers to such a step information screen while performing the cavity core machining step P5 sequentially for the mold with order number 2.

FIG. 34 is an example of the unprocessed task list screen which displays a list of unprocessed tasks currently controlled by the seventh user terminal 218 which controls the mold assembly step P7. This unprocessed task list screen is displayed on the display of the seventh user terminal 218. From this screen, one can see that the seventh user terminal 218 is currently controlling the mold assembly step P7 of order number 1 as an unprocessed task. The operator of the seventh user terminal 218, namely the operator in charge of the mold assembly step P7, may select the "Assemble mold"

box for order number 1 which is an unprocessed task, and display a step information screen on the display of the seventh user terminal 218. The step information screen contains the name of the step, order number, the information required to perform this step and the location of that information, the work contained in this step and the location of the information generated in this step. The operator of the seventh user terminal 218 refers to such a step information screen while performing the mold assembly step P7 for the mold with order number 1.

Here follows a description of the operation of the manufacturing process control system 200 of this preferred embodiment. FIG. 35 is a flowchart showing the operation of the manufacturing process control system 200. Note that the flowchart of FIG. 35 shows only the processing of a single mold (product), but when the processing steps on the mold with one order number are complete, each user terminal can perform the same processing steps on the mold with the next order number.

First, when the drawing which is the information required to perform the mold specification determination step P1 is stored in the data storage region 220c of the manufacturing process control apparatus 202, a signal to the effect that the mold specification determination step P1 can be started (or is to be started) and the drawing which is the information required to perform the mold specification determination step P1 are sent from the transmitter 224 (S1) and received by the first user terminal 206 which controls and executes the mold specification determination step P1 (S2). Next, the operator of the first user terminal 206 performs the preparation of mold specifications which is the work of the mold specification determination step P1 (S3).

When the mold specification determination step P1 is complete, a signal to the effect that the mold specification determination step P1 is complete and the mold specifications which are the information generated in the mold specification determination step P1 are sent from the first user terminal 206 (S4) and received by the receiver 222 (S5). When the mold specifications are stored in the data storage region 220c, a signal to the effect that the mold design step P2 can be started (or is to be started) and the mold specifications which are the information required to perform the mold design step P2 are sent from the transmitter 224 (S6) and received by the second user terminal 208 which controls and executes the work contained in the mold design step P2 (S7). Next, the operator of the second user terminal 208 performs the preparation of core shape data and the preparation of cavity shape data which is the work of the mold design step P2 (S8).

When the mold design step P2 is complete, a signal to the effect that the mold design step P2 is complete and the core shape data and cavity shape data which are the information generated in the mold design step P2 are sent from the second user terminal 208 (S9) and received by the receiver 222 (S10).

When the core shape data is stored in the data storage region 220c, a signal to the effect that the core NC data preparation step P3 can be started (or is to be started) and the core shape data which is the information required to perform the core NC data preparation step P3 are sent from the transmitter 224 (S11) and received by the third user terminal 210 which controls the core NC data preparation step P3 (S12). Next, the operator of the third user terminal 210 performs the preparation of core NC data which is the work of the core NC data preparation step P3 (S13).

When the core NC data preparation step P3 is complete, a signal to the effect that the core NC data preparation step P3 is complete and the core NC data which is the information generated in the core NC data preparation step P3 are sent from the third user terminal 210 (S14) and received by the receiver 222 (S15).

When the cavity shape data is stored in the data storage region 220c, a signal to the effect that the cavity NC data preparation step P4 can be started (or is to be started) and the cavity shape data which is the information required to perform the cavity NC data preparation step P4 are sent from the transmitter 224 (S16) and received by the fourth user terminal 212 which controls and executes the cavity NC data preparation step P4 (S17). Next, the operator of the fourth user terminal 212 performs the preparation of cavity NC data which is the work of the cavity NC data preparation step P4 (S18).

When the cavity NC data preparation step P4 is complete, a signal to the effect that the cavity NC data preparation step P4 is complete and the cavity NC data which is the information generated in the cavity NC data preparation step P4 are sent from the fourth user terminal 212 (S19) and received by the receiver 222 (S20).

When the core NC data is stored in the data storage region 220c, a signal to the effect that the core machining step P5 can be started (or is to be started) and the core NC data which is the information required to perform the core machining step P5 are sent from the transmitter 224 (S21) and received by the fifth user terminal 214 which controls the core machining step P5 (S22). Next, the operator of the fifth user terminal 214 performs the core machining which is the work of the core machining step P5 (S23). The core machining is performed by the machining center 230 connected to the fifth user terminal 214. When the core machining is complete, a core machined article number is attached to the core machined article and this core machined article number is input to the fifth user terminal 214.

When the core machining step P5 is complete, a signal to the effect that the core machining step P5 is complete and the core machined article number which is the information generated in the core machining step P5 are sent from the fifth user terminal 214 (S24) and received by the receiver 222 (S25).

On the other hand, when the cavity NC data is stored in the data storage region 220c, a signal to the effect that the cavity machining step P6 can be started (or is to be started) and the cavity NC data which is the information required to perform the cavity machining step P6 are sent from the transmitter 224 (S26) and received by the sixth user terminal 216 which controls the cavity machining step P6 (S27). Next, the operator of the sixth user terminal 216 performs the cavity machining which is the work of the cavity machining step P6 (S28). The cavity machining is performed by the machining center 232 connected to the sixth user terminal 216. When the cavity machining is complete, a cavity machined article number is attached to the cavity machined article and this cavity machined article number is input to the sixth user terminal 216.

When the work contained in the cavity machining step P6 is complete, a signal to the effect that the cavity machining step P6 is complete and the cavity machined article number which is the information generated in the cavity machining step P6 are sent from the sixth user terminal 216 (S29) and received by the receiver 222 (S30).

When the received core machined article number and cavity machined article number are stored in the step control table 220b, a signal to the effect that the mold assembly step P7 can be started (or is to be started) and the core machined article number and cavity machined article number which are the information required to perform the mold assembly step P7 are sent from the transmitter 224 (S31) and received by the seventh user terminal 218 which controls the mold assembly step P7 (S32). Next, the operator of the seventh user terminal 218 performs the mold assembly of the core and cavity which is the work of the mold assembly step P7 (S33). When the mold assembly of the core and cavity is complete, a product number is attached to the product (mold) consisting of the core and cavity thus assembled and this product number is input to the seventh user terminal 218.

When the work contained in the mold assembly step P7 is complete, a signal to the effect that the mold assembly step P7 is complete and the product number which is the information generated in the mold assembly step P7 are sent from the seventh user terminal 218 (S34) and received by the receiver 222 (S35). Note that this product is managed by means of the product number and shipped.

In addition, the progress of this mold manufacturing process is controlled by the progress controller 226 based on the information contained in the step control table 220*b*, and displayed on the display 228 as needed.

The manufacturing process control system 200 according to Preferred Embodiment 2 described above controls the work contained in the seven steps P1 through P7 by means of seven user terminals 206 through 218 which differ depending on the step, but one user terminal may also control or execute two or more steps. In addition, one step may also be controlled or executed by a plurality of user terminals.

In addition, the present invention was described using the design and manufacture of molds as an example, but the ideas expressed in the present invention recited in the claims are not limited to the design and manufacture of molds, but rather they are applicable to any method by which work consisting of a plurality of steps is executed under computer control.

What is claimed is:

1. A method for executing work with a plurality of work steps sequentially performed under the control of a central processing computer coupled to a plurality of terminal computers, with each of the work steps being executed by one of the plurality of terminal computers, wherein the method comprises:

receiving from one terminal computer of the plurality of terminal computers (i) a work completion signal for one work step of the plurality of work steps and (ii) information generated in said one work step when said one terminal computer assigned to said one work step has completed said one work step assigned thereto, said generated information including information required to perform a next work step, storing said generated information in storage means for storing information required to execute each of said work steps, determining whether or not information required to perform said next work step is stored in said storage means when said work completion signal is received, if said determining step has a positive result, sending, to a terminal computer of the plurality of terminal computers used for said next work step, (i) a signal to effect that said next work step can be started and (ii) said generated information required to perform said next work step, and displaying a sign, indicating that said next work step can be started, on a screen of said terminal computer used for said next work step so as to allow said sign displayed on its display screen to be clicked to start said next work step.

2. The method according to claim 1, wherein in the event that at least one work step among said plurality of work steps includes a plurality of tasks that can be performed in parallel, said central processing computer recognizes from work steps prior to this at least one work step, that this at least one work step contains a plurality of tasks that can be performed in parallel, and when a work completion signal arrives from a terminal computer assigned to a work step immediately prior to this at least one work step, it can generate a number of work item notices corresponding to said plurality of tasks.

3. A method for executing work with a plurality of work steps sequentially performed under the control of a central processing computer coupled to a plurality of terminal computers, with each of the work steps being executed by one of the plurality of terminal computers, wherein the method comprises:

receiving from one terminal computer of the plurality of terminal computers (i) a work completion signal for one work step of the plurality of work steps and (ii) information generated in said one work step when said one terminal computer assigned to said one work step has completed said one work step assigned thereto, said generated information including information required to perform a next work step, storing said generated information in storage means for storing information required to execute each of said work steps, determining whether or not information required to perform said next work step is stored in said storage means when said work completion signal is received, and if said determining step has a positive result, sending, to a terminal computer of the plurality of terminal computers used for said next work step, (i) a signal to effect that said next work step can be started and (ii) said generated information required to perform said next work step.

4. An apparatus for executing work with a plurality of work steps performed sequentially under computer control, the apparatus comprising:

a central processing computer, a plurality of terminal computers, each of which executes one of said plurality of work steps, and a storage means for storing information required to execute said plurality of work steps, wherein said central processing computer receives a work completion signal for one of said work steps and information generated in said one of the work steps from one of said terminal computers when said one of the terminal computers assigned to said one of the work steps has completed said one of the work steps assigned thereto, said information generated including information required to perform a next work step, wherein said central processing computer stores said information in storage means for storing information generated required to execute each of said work steps, wherein said central processing computer checks whether or not information required to perform said next work step is stored in said storage means when said work completion signal is received and, if so, then said central processing computer sends to a terminal computer used for said next work step (i) a signal to effect that said next work step can be started and (ii) said information required to perform said next work step, and said terminal computer used for said next step displays, on a screen of said terminal computer used for said next work step, a sign indicating that said next work step can be started so as to allow said sign displayed on said screen to be clicked to start said next work step.

* * * * *